US009697130B2

(12) United States Patent
Karippara et al.

(10) Patent No.: US 9,697,130 B2
(45) Date of Patent: Jul. 4, 2017

(54) SYSTEMS AND METHODS FOR STORAGE SERVICE AUTOMATION

(71) Applicant: SanDisk Technologies LLC, Plano, TX (US)

(72) Inventors: Jaidil Karippara, San Ramon, CA (US); Pavan Pamula, Fremont, CA (US); Yuepeng Feng, Fremont, CA (US); Vikuto Atoka Sema, Fremont, CA (US)

(73) Assignee: SanDisk Technologies LLC, Plano, TX (US)

( * ) Notice: Subject to any disclaimer, the term of this patent is extended or adjusted under 35 U.S.C. 154(b) by 229 days.

(21) Appl. No.: 14/332,696

(22) Filed: Jul. 16, 2014

(65) Prior Publication Data

US 2015/0378921 A1 Dec. 31, 2015

Related U.S. Application Data

(60) Provisional application No. 62/017,128, filed on Jun. 25, 2014.

(51) Int. Cl.
*G06F 12/00* (2006.01)
*G06F 12/0868* (2016.01)
(Continued)

(52) U.S. Cl.
CPC ............ *G06F 12/0868* (2013.01); *G06F 3/06* (2013.01); *G06F 9/45533* (2013.01); *G06F 9/50* (2013.01); *G06F 12/084* (2013.01); *G06F 12/0866* (2013.01); *G06F 12/0871* (2013.01); *G06F 12/0888* (2013.01); *G06F 13/28* (2013.01); *G06F 2212/151* (2013.01); *G06F 2212/313* (2013.01)

(58) Field of Classification Search
CPC ........................ G06F 12/0871; G06F 2212/151
See application file for complete search history.

(56) References Cited

U.S. PATENT DOCUMENTS 7,694,065 B2 4/2010 Petev et al.
8,244,935 B2 8/2012 Leventhal et al.
(Continued)

FOREIGN PATENT DOCUMENTS

WO 2013023090 A2 2/2013
WO 2014036307 A1 3/2014

OTHER PUBLICATIONS

USPTO, Office Action for U.S. Appl. No. 14/262,581 mailed Jun. 19, 2014.
(Continued)

*Primary Examiner* — Zachary K Huson
(74) *Attorney, Agent, or Firm* — Stoel Rives LLP

(57) ABSTRACT

A cache automation module detects the deployment of storage resources in a virtual computing environment and, in response, automatically configures cache services for the detected storage resources. The automation module may detect new storage resources by monitoring storage operations and/or requests, by use of an interface provided by virtualization infrastructure, and/or the like. The cache automation module may deterministically identify storage resources that are to be cached and automatically caching services for the identified storage resources.

21 Claims, 13 Drawing Sheets

(51) Int. Cl.

| | | |
|---|---|---|
| *G06F 9/455* | (2006.01) | |
| *G06F 13/28* | (2006.01) | |
| *G06F 3/06* | (2006.01) | |
| *G06F 12/084* | (2016.01) | |
| *G06F 12/0866* | (2016.01) | |
| *G06F 12/0871* | (2016.01) | |
| *G06F 12/0888* | (2016.01) | |
| *G06F 9/50* | (2006.01) | |

(56) References Cited

U.S. PATENT DOCUMENTS

| | | |
|---|---|---|
| 8,479,294 B1 | 7/2013 | Li et al. |
| 8,549,222 B1 | 10/2013 | Kleiman et al. |
| 2008/0271039 A1 | 10/2008 | Rolia et al. |
| 2009/0132621 A1 | 5/2009 | Jensen et al. |
| 2011/0179162 A1 | 7/2011 | Mayo et al. |
| 2011/0225342 A1 | 9/2011 | Sharma et al. |
| 2011/0238546 A1 | 9/2011 | Certain et al. |
| 2011/0265083 A1 | 10/2011 | Davis |
| 2012/0210066 A1 | 8/2012 | Joshi et al. |
| 2012/0254824 A1 | 10/2012 | Bansod |
| 2012/0278588 A1 | 11/2012 | Adams et al. |
| 2013/0198459 A1 | 8/2013 | Joshi et al. |
| 2013/0232303 A1 | 9/2013 | Quan |
| 2013/0339958 A1 | 12/2013 | Droste et al. |
| 2014/0013059 A1* | 1/2014 | Joshi .................. G06F 12/0815 711/144 |
| 2014/0136872 A1 | 5/2014 | Cooper et al. |
| 2014/0156938 A1 | 6/2014 | Galchev et al. |

OTHER PUBLICATIONS

USPTO, Office Action Interview Summary for U.S. Appl. No. 13/541,659 mailed Aug. 26, 2014.

USPTO, Office Action for U.S. Appl. No. 13/687,979 mailed Sep. 9, 2014.

USPTO, Office Action for U.S. Appl. No. 13/192,365 mailed Jul. 17, 2014.

USPTO, Office Action for U.S. Appl. No. 13/287,998 mailed Jun. 10, 2014.

USPTO, Office Action for U.S. Appl. No. 13/288,005 mailed Jul. 8, 2014.

* cited by examiner

565

| | |
|---|---|
| *.sys | Admittable |
| *.dat | Exclude |
| *\windows\system32\* | Admittable |
| *\windows\system\* | Admittable |
| *\documents\corporate_template.doc | Admittable |
| *\applications\word_processing\* | Admittable |
| *\working_files\* | Exclude |
| Application_X | Admittable |
| Attrib X | Admittable |
| ... | ... |

FIG. 6

UFID 555     564     DID 557

| | |
|---|---|
| \\VID\windows\system32\xpssvcs.dll | F30FA423 |
| \\VID\windows\system32\xpsshhdr.dll | DE451BE4 |
| \\VID\windows\system32\xmlprov.dll | 45AD342E |
| \\VID\windows\system32\ansi.sys | 12EF33A3 |
| \\VID\windows\system32\svchost.exe | 20AE45EA |
| \\VID\windows\system32\kernel32.dll | EA733BA0 |
| ... | ... |

FIG. 7

| DID 557 | 535 | 857 | 859 |
|---|---|---|---|
| F30FA423 | Physical Address: 12 | | 114A, 114B |
| DE451BE4 | Physical Address: 89 | | 114N |
| 45AD342E | Physical Address: 23 | | 114B |
| 12EF33A3 | Physical Address: 42 | | 114A, 114B |
| 20AE45EA | Physical Address: 54 | | * |
| EA733BA0 | Physical Address: 33 | | 114N |
| ... | ... | | ... |

FIG. 8

Automation Metadata
1056

| | |
|---|---|
| 1071A VM name contains "SQL" | 1073A |
| 1071B application = X | 1073B |
| 1071C user = Y | 1073C |
| 1071D Storage resource name contains "db" | 1073D |
| 1071E Storage = clustered shared | 1073E |
| 1071F Host name contains "servers" | 1073F |
| ... | ... |
| 1071N * | 1073N |

1070 / 1072

SYSTEMS AND METHODS FOR STORAGE SERVICE AUTOMATION

TECHNICAL FIELD

This disclosure pertains to virtual computing environments and, in particular, to systems and methods for automatically configuring cache services in response to changes to the storage topology of a virtual computing environment.

BACKGROUND

Virtual computing environments may generate high input/output (I/O) overhead. Caching services may be used to reduce I/O overhead, increase virtual machine (VM) density, and improve system performance. Typically, caching services are configured on a per-VM and/or per-volume basis. As such, virtual computing environments that have a dynamic storage topology may require significant administrative overhead.

BRIEF DESCRIPTION OF THE DRAWINGS

This disclosure includes and references the accompanying drawings, which provide a more particular description of the embodiments disclosed herein. The disclosure, however, is not limited to the particular embodiments depicted in the figures. The teachings of the disclosure may be utilized and/or adapted to other embodiments, and/or changes may be made to the disclosed embodiments, without departing from the scope of the disclosure.

FIG. 6 depicts embodiments of file-sharing metadata.

FIG. 7 depicts further embodiments of file-sharing metadata.

FIG. 8 depicts further embodiments of file-sharing metadata.

DETAILED DESCRIPTION

Figure 1A:
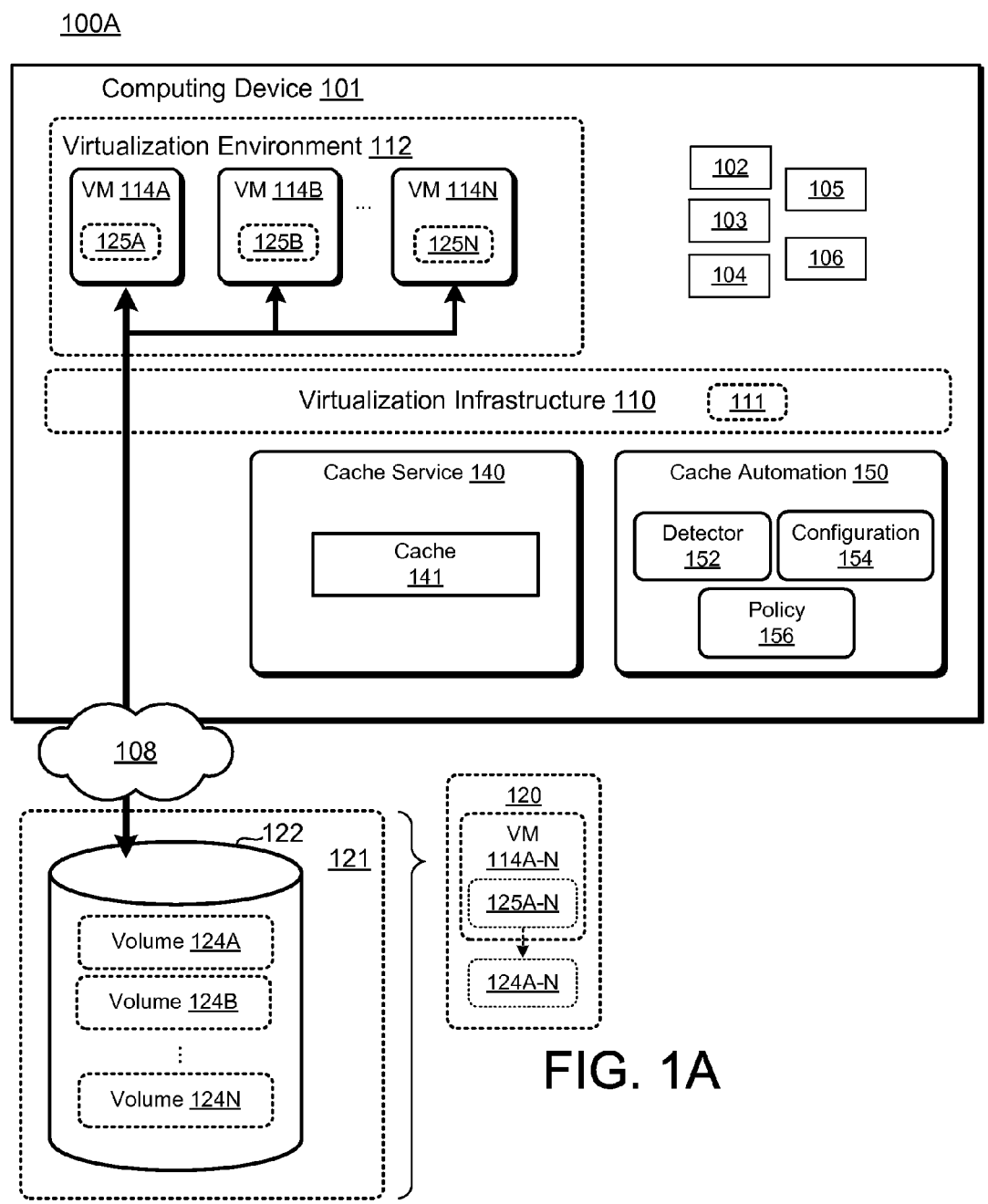
FIG. 1A is a block diagram depicting one embodiment of a system for automated I/O configuration.

In some systems, an administrator is required to configure (and/or re-configure) caching services in response to changes to the I/O topology of a computing system. As used herein, an "I/O topology" or "storage topology" refers to the set of storage resources utilized and/or referenced within a computing environment. The I/O topology of a virtual computing environment may correspond to the storage resources utilized and/or referenced by VMs deployed within the virtual computing environment. The I/O topology may, for example, correspond to relationships between virtual storage resources defined within VMs deployed within the virtual computing environment, such as virtual disks, virtual volumes, VM images, and/or the like, and the underlying, primary storage resources associated with the virtual computing resources (e.g., hard drive, storage service, network attached storage, and/or the like). Accordingly, a storage resource may refer to one or more of a virtual machine (VM), VM container, virtualization engine, virtual private server, virtual desktop, virtual file, virtual disk, virtual volume, and/or the like that corresponds to a respective primary storage resource. Accordingly, as used herein, a storage resource may refer to a file, disk, volume, storage system, and/or the like.

Many virtual computing environments have a highly dynamic I/O topology; VMs may be deployed, re-deployed, and/or migrated between hosts, and the VMs may create, utilize, and/or reference various storage services (through respective VMs, virtual disks, virtual volumes, and/or the like). In such systems, thousands of VMs and/or storage services may be added and/or removed each day. As such, it may be impractical to manually configure and re-configure caching services in these types of systems. As used herein, "deployment" of a VM refers to running, starting up, creating, activating, migrating, importing, v-motioning in, resuming, powering-on, booting, and/or initializing a VM for operation within a virtualization environment on a host computing device. Accordingly, VM deployment may include, but is not limited to: creating a VM for operation within a virtualization environment, booting a VM within the virtualization environment, resuming a VM, transferring a VM for operation within the virtualization environment or between members of the virtualization environment, activating a VM, powering on a VM, bringing a VM online, connecting and/or coupling a VM to the virtualization environment, and/or the like. Deploying a VM may comprise deploying one or more storage resources for use by a VM. VMs may utilize and/or reference storage resources and, as such, deploying a VM may comprise deploying one or more storage resources. Alternatively, or in addition, deployed VMs may create, initialize, utilize, and/or reference new storage resources within the virtualization environment, such as virtual disks, virtual storage volumes and/or the like. Accordingly, deploying a storage resource may comprise a) deploying a VM within a virtualization environment and/or b) utilizing and/or referencing an additional storage resource within a VM by, inter alia, defining a virtual disk, virtual storage volume, and/or the like.

Disclosed herein are systems and methods for providing automated caching services configured to, inter alia, a) identify changes in the I/O topology within a computing environment, such as a virtual computing environment, and b) automatically configure (and/or reconfigure) caching services in response to the identified changes. In some embodiments, a cache automation service or module is configured to detect the addition of a storage resource, and, in response, configure caching services for the storage resource. As used herein, automatically configuring and/or reconfiguring caching and/or other I/O services refers to implementing configuration changes in a computing environment without administrator intervention. Accordingly, automatically configuring and/or reconfiguring I/O services may refer to deploying I/O services based on pre-determined configuration information, without involvement of an administrator. As disclosed in further detail herein, the pre-determined configuration information may be used by an automation service to a) deterministically identify storage resources for which caching services are to be provided as the storage resources are deployed and b) automatically configure caching services for the identified storage resource in accordance with the pre-determined configuration information. Therefore, automatically configuring caching services may refer to the use of defined configuration and/or policy information to automatically deploy and/or redeploy caching services in a system response to changes in the I/O topology of the system without direct involvement by an administrator.

As used herein, detecting the addition of a storage resource may include, but is not limited to: determining that a VM is being activated on a host computing device, determining that a VM is booting up on the host computing device, determining that a VM is to be transferred to the host computing device, determining that a VM is to resume operation on the host computing device, determining that a VM is initializing, receiving a trigger or signal that a VM is booting up, reading a configuration setting, probing a module that monitors VM status, utilizing and/or referencing an interface of the virtualization environment, virtualization platform, virtualization infrastructure and/or host computing device, and/or identifying access to a new storage service (e.g., by a new VM and/or through a new storage service), and/or the like. The addition of a storage resource may correspond to deployment of a VM within the virtual computing environment and/or deployment of a storage resource by an existing VM within the virtual computing environment (e.g., a VM creating, initializing, utilizing, and/or referencing a storage resource through, inter alia, a virtual storage resource). Detecting the addition of the storage resource may comprise receiving a notification from the virtualization environment, virtualization infrastructure, virtualization platform, and/or host computing device through, inter alia, an interface thereof. Alternatively, or in addition, the cache automation module and/or service may be configured to monitor the virtualization environment, virtualization infrastructure, virtualization platform, and/or host computing device to identify deployment of VMs and/or use of additional storage resources. The cache automation service may implement an algorithm and/or policy to deterministically identify storage resources that should be cached, and to automatically configure caching services for the storage resources within the virtualization environment. The cache automation service may, therefore, comprise an autocache configuration and/or policy that may be used to select VMs and/or storage volumes to which caching services are to be provided in response to the VMs and/or storage volumes being deployed within the system, and without introducing delays due to, inter alia, manual configuration operations. As used herein, "caching services" refers to a memory or disk caching services that service I/O requests pertaining to primary storage resources. As used herein, a primary storage resource refers to a storage resource associated with a virtual storage resource within a virtualization environment. A "cache" refers to modules, components, and/or resources for providing caching services and, as such, may include, but are not limited to: a cache manager, cache metadata, cache storage (volatile and/or non-volatile storage resources), and/or the like.

In some embodiments, caching services are provided by use of limited cache storage resources, accessible to a plurality of VMs deployed within the virtual computing environment. The cache automation service may be further to manage allocation of the limited resources by identifying VMs and/or storage resources that are no longer in use and, in response, configuring caching services accordingly. The cache automation service may, for example, be configured to de-allocate cache storage resources provisioned to a particular VM and/or storage resource in response to determining that the VM and/or storage resource is no longer in use (e.g., the VM has been shut down, has migrated to another host, as unmapped the storage resource, and/or the like). Alternatively, or in addition, the cache automation module may be configured to provision cache storage resources based on an allocation policy that, inter alia, defines a relative priority to VMs and/or storage resources to ensure sufficient cache resource availability for high-priority VMs and/or storage resources.

The cache automation module may also be adapted to configure other I/O services, such as file-sharing caching services (file-level de-duplication) and/or write-vectoring. As used herein a "de-duplication cache" or "file-share cache" refers to a caching service configured to manage data shared by two or more different storage clients (two or more different VMs). As disclosed above, "write vectoring" refers to adapting I/O resources used to service I/O requests according to a particular persistence level. Write-vectoring may comprise storing data that does not need to be retained indefinitely in interim storage without accessing the corresponding primary storage resource(s). Such data may include data that is to be retained while the corresponding storage client (e.g., VM) is running, but can be discarded after a particular time and/or in response to a particular condition and/or trigger. Data that can be discarded after a particular time, in response to a particular condition or trigger is referred to herein as "ephemeral data," "temporary data," "transient data," "interim data," "write-vectored data," "disposable data," and/or the like.

Disclosed herein are embodiments of a method for automated I/O configuration. The disclosed method may include detecting a virtual machine deployed on a host computing device, determining a cache configuration for the detected virtual machine, and/or configuring a cache to service I/O requests pertaining to the detected virtual machine in accordance with the determined cache configuration. Detecting the virtual machine may comprise identifying a virtual machine not previously operating on the host computing device. As used herein, determining a cache configuration refers to one or more of determining whether to provide caching services for the detected virtual machine (and/or corresponding storage resources), determining a configuration of the caching services to provide, such as a cache mode, resource allocation(s), and so on. Determining a cache configuration may comprise accessing and implementing a cache automation policy and/or configuration (e.g., reading a default cache configuration), evaluating a policy, and/or the like. Accordingly, determining a cache configuration may comprise accessing and/or reading configuration information, evaluating configuration information, such as a cache policy, directives, and/or the like, receiving a cache configuration, editing and/or modifying a cache configuration, and/or the like.

As used herein, configuring the cache refers to configuring one or more cache components to provide caching services for the detected virtual machine and/or storage resources utilized and/or referenced by the virtual machine.

Configuring the cache to service I/O requests pertaining to the detected virtual machine may comprise activating an I/O filter configured to identify I/O requests pertaining to the detected virtual machine within the host computing device. Configuring the cache to service I/O requests pertaining to the detected storage volume may include utilizing a storage driver operating within the detected virtual machine to redirect storage requests of the virtual machine to the cache. The disclosed method may further comprise determining whether to cache data of the detected virtual machine based on a pre-determined criterion.

Disclosed herein are embodiments of an apparatus for automated I/O configuration, which may comprise a detector to identify addition of a storage resource, a cache automation module that determines whether to cache data of the identified storage resource, and/or a configuration engine that automatically configures cache services for the storage resource. The cache automation module may determine whether to cache data of the identified storage resource based on one or more of a type of the storage resource, a name of a virtual machine associated with the identified storage resource, an application associated with the identified storage resource, and a file name associated with the identified storage resource. The configuration engine may be configured to exclude the identified storage resource from caching services in response to determining that the identified storage resource is a cluster shared volume. In some embodiments, the configuration engine automatically configures a driver to redirect requests sent to the identified storage resource to a cache manager. The driver may be configured for operation within a guest operating system of a virtual machine, and the driver may be configured to redirect requests to a cache manager operating within the guest operating system. In some embodiments, the driver is configured to identify requests pertaining to the identified storage resource in a storage stack of a host computing device of a virtual machine associated with the virtual storage resource.

The configuration engine may indicate that requests pertaining to the identified storage resource are ephemeral, and the configuration engine may configure a cache manager to service requests pertaining to the identified storage resource by use of an ephemeral storage resource, independent of a primary storage resource corresponding to the storage resource. Alternatively, or in addition, the configuration engine may designate files of the identified storage resource for storage in a file sharing cache.

In some embodiments, the detector identifies the addition of the storage resource in response to one or more of initialization of a virtual machine on a host computing device, and initialization of a storage resource of a virtual machine. The detector may identify the addition of the storage resource by use of an application programming interface of a virtualization platform.

Disclosed herein are embodiments of a system for automated I/O configuration, comprising a cache manager that provides caching services to virtual machines configured for operation within a virtualization infrastructure, a monitor that detects deployment of a virtual storage volume within the virtualization infrastructure, and a configuration agent that configures caching services for the deployed virtual storage volume in accordance with an autocache configuration in response to the detection. The monitor may detect deployment of the virtual storage volume by use of an interface provided by the virtualization infrastructure. The configuration agent may configure a storage driver to redirect storage requests pertaining to the virtual storage volume to the cache manager. In some embodiments, the configuration agent configures a storage driver operating within a guest operating system to redirect storage requests pertaining to the virtual storage volume to the cache manager. The configuration agent may be adapted to automatically configure caching services for the virtual storage volume in response to determining that the virtual storage volume complies with a cache policy of the autocache configuration. The cache policy may distinguish virtual storage volumes for caching services based on one or more of: storage volume type, virtual machine name, storage volume file name, and application name.

FIG. 1A is a block diagram depicting one embodiment of a system 100A for automated I/O configuration. The system 100A comprises a virtualization infrastructure 110 capable of hosting a plurality of VMs 114A-N. The system 100A may include a computing device 101, which may comprise one or more of a personal computer, a desktop, a workstation, a server, a mainframe, a node, a cluster (e.g., a plurality of interconnected computing devices), and/or the like. Accordingly, although illustrated as a single element, the computing device 101 may comprise and/or consist of a plurality of separate computing devices. The computing device 101 may comprise processing resources 102, memory resources 103, non-transitory computer-readable storage resources 104, a communication interface 105, and so on. The virtualization environment 112, virtualization infrastructure 110, and/or VMs 114A-N may operate, at least in part, on the computing device 101. Accordingly, the computing device 101 may be referred to as a "host computing device." As used herein, a "host computing device" refers to a computing device capable of and/or configured to provide a virtualization infrastructure 110 and/or virtualization environment 112 for one or more VMs 114A-N. The virtualization infrastructure 110 and/or virtualization environment 112 may include, but are not limited to one or more: virtualization containers, virtualization kernels, virtualization engines, hypervisors, virtual private servers, virtual desktop infrastructure, virtualization platforms, virtualization centers, virtualization clusters, virtualization services, and/or the like. The VMs 114A-N disclosed herein may correspond to a software-based emulation of a computing device. Accordingly, the VMs 114A-N may comprise respective virtual operating environments (e.g., guest operating systems) capable of implementing computing services, such as executing user applications, displaying user interface elements (through a virtual and/or display interface), implementing server functionality (e.g., implementing a database application, web server, etc.), and so on. In some embodiments, the VMs 114A-N comprise virtual desktops, virtual workstations, virtual servers, and/or the like. The VMs 114A-N may be accessible via the network 108 (through and/or by use of the virtualization environment 112 and/or virtualization infrastructure 110).

The processing resources 102 of the computing device 101 may include, but are not limited to, general purpose central processing units (CPUs), application-specific integrated circuits (ASICs), and programmable logic elements, such as field programmable gate arrays (FPGAs), programmable logic arrays (PLAs), and the like. The memory resources 103 may include volatile random-access memory (RAM), such as dynamic RAM (DRAM), cache memory (e.g., processor cache), and/or the like. The communication interface 104 may be configured to communicatively couple the computing device 101 to a network 108. The network 108 may comprise any suitable communication network, including, but not limited to, a Transmission Control Protocol/Internet Protocol (TCP/IP) network, a Local Area Network (LAN), a Wide Area Network (WAN), a Virtual Private Network (VPN), or a Storage Area Network (SAN). The computing device 101 may further comprise a base operating environment 106, which may comprise a base operating system, a bare-metal operating system, and/or the like.

The computing device 101 may comprise a virtualization infrastructure 110 configured to provide a virtualization environment 112 for the VMs 114A-N. The virtualization infrastructure 110 may include, but is not limited to, a virtualization platform; a virtualization manager; a kernel-based virtualization infrastructure, such as a virtualization kernel or the like, a hypervisor, a VM monitor, a virtual operating platform, and/or the like. The virtualization environment 112 may comprise a guest operating environment, a kernel-based VM environment (KVM), and/or the like.

I/O requests 115 of the VMs 114A-N may be serviced by use of an I/O stack 107. The I/O stack 107 may comprise an I/O and/or storage architecture of one or more of the computing device 101, the base operating environment 106, the virtualization environment 112, and/or the virtualization infrastructure 110. The I/O stack 107 may comprise a framework in which storage services such as file system drivers, volume drivers, disk drivers, Small Computer System Interface (SCSI) drivers, and/or the like are deployed.

I/O requests 115 of the VMs 114A-N may be directed to primary storage resources 121 through the I/O stack 107. The VMs 114A-N may reference and/or utilize primary storage resources 121 by use of the virtualization infrastructure 110 and/or virtualization environment 112. A primary storage resource 121 may comprise and/or be referred to as primary storage, an underlying storage resource, underlying storage, a backing storage resource, and/or backing storage, and/or the like. The primary storage resources 121 may include, but are not limited to: one or more storage devices, disks, and hard drives; a storage system; a Redundant Array of Inexpensive Disks (RAID); Just a Bunch of Disks (JBOD); network-attached storage (NAS); a SAN; a logical storage unit (LUN), a virtual LUN (vLUN), memory, battery-backed RAM, and/or the like. The primary storage resources 121 may be accessible by the plurality of VMs 114A-N and/or VMs deployed on other computing devices (not shown). In the FIG. 1A embodiment, the primary storage resources 121 include a storage system 122 comprising one or more disks and/or volumes 124A-N. The volumes 124A-N may comprise and/or correspond to one or more of a: physical storage volume, a physical storage partition, a logical storage volume, a logical partition, a Logical Unit Number (LUN), a virtual LUN (vLUN), an object, a file, and/or the like. The VMs 114A-N may reference primary storage resources 121 directly and/or through the virtualization environment 112 and/or virtualization infrastructure 110. In some embodiments, the VMs 114A-N comprise one or more virtual disks and/or virtual volumes 125A-N, which may correspond to respective primary storage resources 121 (e.g., respective volumes 124A-N). The VMs 114A-N may, therefore, utilize and/or reference primary storage resources 121 (e.g., files, disks, volumes 124A-N, and so on) through respective virtual files, disks and/or volumes 125A-N. Although FIG. 1A depicts VMs 114A-N comprising a single respective virtual disk and/or volume 125A-N, the disclosure is not limited in this regard and the VMs 114A-N could utilize and/or reference storage services 120 corresponding to any number of virtual disks and/or virtual volumes 125A-N. As illustrated in FIG. 1A, the storage services 120 in the system 100A may correspond to associations between VMs 114A-N and primary storage resources 121. The associations may be managed by the virtualization environment 112 and/or virtualization infrastructure 110 (e.g., hypervisor, virtualization kernel, and/or the like). Accordingly, a storage service 120 may include, but is not limited to: a file, disk, volume, LUN, vLUN, and/or the like. VMs 114A-N and/or other storage clients may issue I/O requests to the virtual storage resources 124A-N, which may be translated and/or directed to underlying primary storage resources 121 by the virtualization environment 112, virtualization infrastructure 110, base operating system 106, and/or the like. Accordingly, relationships between virtual storage resources 125A-N and primary storage resources 121 (e.g., files, disks, volumes 125A-N) may correspond to a set storage services 120 utilized and/or referenced within the system 100A. The set of storage services 120 (e.g., associations between VMs 114A-N, virtual storage resources 124A-N and primary storage resources 125A-n) may define, at least in part, the I/O topology of the system 100A.

The system 100A may further include a cache service 140 configured to provide caching services to the VMs 114A-N by, inter alia, servicing selected I/O requests of the VMs 114A-N by use of a cache storage device (e.g., cache 141). In some embodiments, the cache 141 comprises a persistent, non-volatile storage device and/or medium, which may include, but is not limited to: a solid-state storage medium, NAND flash memory, NOR flash memory, nano RAM (NRAM), magneto-resistive RAM (MRAM), phase change RAM (PRAM), Racetrack memory, Memristor memory, nanocrystal wire-based memory, silicon-oxide-based sub-10 nanometer process memory, graphene memory, Silicon-Oxide-Nitride-Oxide-Silicon (SONOS) memory, resistive RAM (RRAM), programmable metallization cell (PMC) memory, conductive-bridging RAM (CBRAM), and/or the like. Alternatively, or in addition, the cache 141 may comprise volatile memory resources. Although particular embodiments of memory and/or storage resources are disclosed herein, the teachings of this disclosure could be applied to any suitable memory and/or storage type, including both non-volatile and volatile forms. In some embodiments, the cache 141 comprises a storage resource that is local to the computing device 101 (e.g., is coupled to the computing device 101 by use of a bus, such as a SATA bus, PCI bus, storage bus, and/or the like). Alternatively, the cache 141 may be communicatively coupled to the computing device 101 through the network 108 or another communication and/or I/O mechanism.

The cache service 140 may be configured to provide caching services to a plurality of VMs 114A-N deployed on the computing device 101, which may comprise a) provisioning cache storage capacity to the VMs 114A-N, b) identifying I/O requests of the VMs 114A-N, and c) servicing the identified I/O requests using the resources provisioned to the corresponding VM 114A-N. Configuring caching services may, therefore, comprise configuring the cache service 140 to: a) identify VMs 114A-N and/or virtual volumes 125A-N for which caching services are to be provided, b) provision cache resources to particular VMs 114A-N and/or storage services 120, c) redirect I/O requests to the identified VMs 114A-N and/or virtual volumes 125A-N to the cache service 140, and/or d) service the redirected I/O requests according to a particular cache policy and/or cache mode (e.g., write through, write back, and/or the like). Although the cache service 140 is depicted as operating within the base operating system 105 of the computing device 101, the disclosure is not limited in this regard. In some embodiments, the cache service 140 may be configured for operation within one or more of the VMs 114A-N operating within the virtualization environment 112 (e.g., in a designated one of the VMs 114A-N). Alternatively, or in addition, the cache service 140 may be implemented as a module and/or component of the virtualization infrastructure 110 and/or virtualization environment 112.

Changes to the I/O topology of the system 100A may require corresponding changes to the configuration of caching services. As used herein, an "I/O topology" or "storage topology" refers to the set of storage resources utilized and/or referenced within a system, such as system 100A. The I/O topology of FIG. 1A may, therefore, correspond to the VMs 114A-N and/or the storage services 120 utilized and/or referenced by the VMs 114A-N, and may include a set of relationships between storage clients (e.g., VMs 114A-N and/or virtual storage volumes 125A-N) and corresponding primary storage resources 121 (e.g., storage system 122, files, disks, and/or volumes 124A-N, and so on). A change to the I/O topology of the system 100A may correspond to one or more of: deployment of a VM 114A-N within the virtualization environment 112, shutdown of a VM 114A-N, migration of a VM 114A-N to/from the computing device 110, initialization of a storage service 120 by a VM 114A-N and/or the virtualization infrastructure 110, and/or any other operation that results in a change to the set of storage resources utilized and/or referenced within the system 100A.

In some systems, an administrator may be required to configure (and re-configure) caching services in response to changes to I/O topology. In complex systems having a dynamic I/O topology, the administrative overhead involved in responding to such changes can become significant. Moreover, the performance of the system may suffer while caching services are not properly configured (and/or are only partially configured). As illustrated in FIG. 1A, the system 100A may comprise a cache automation module 150 configured to automatically configure cache services in response to I/O topology changes in the system 100A. The cache automation module 150 may be configured to a) identify the addition of a storage resource within the system 100A (e.g., a deployment of a VM 114A-N and/or storage service 120), b) determine whether to enable caching services for the identified storage resource, and/or c) automatically configure caching services for the identified storage resource. As used herein, addition of a storage resource refers to a change in the I/O topology of the system 100A resulting in utilization of and/or reference to a storage resource by one or more VM 114A-N. Addition of a storage resource may, therefore, correspond to deployment of a VM 114A-N within the virtualization infrastructure 110 (resulting in creation and/or initialization of storage services 120 comprising virtual disks and/or volumes 125A-N of the VM 114A-N that correspond to respective primary storage resources 121), creation and/or initialization of storage services 120 by a VM 114A-N already operating within the virtualization environment 112, and/or the like. The cache automation module 150 may determine whether to enable caching services for the identified storage resource based on characteristics and/or properties of the identified storage resource (e.g., whether the storage resource is suitable for caching, as disclosed in further detail herein), characteristics and/or properties of a storage client associated with the identified storage resource (e.g., the VM 114A-N corresponding to the identified storage resource, application(s) utilizing the identified storage resource, files stored on the identified storage resource), a cache configuration policy, and/or the like. Automatically configuring cache services may include a) provisioning resources for use in caching data of the identified storage resource in, inter alia, the cache 141, and/or b) configuring a cache manager (and/or other component of the system 100A) to redirect I/O requests pertaining to the identified storage resource to the cache service 140. As disclosed in further detail herein, I/O requests pertaining to the identified storage resource may be identified and/or redirected within a respective virtual machine 114A-N and/or within a storage stack of the computing device 101 (e.g., a storage stack of the virtualization infrastructure 110 and/or base operating environment 106).

The cache automation module 150 may comprise a detector 152 configured to identify changes to the I/O topology within the system 100A and, in particular, identify addition of storage resource(s) within the system 100A. The detector 152 may be configured to monitor the I/O topology of the system 100A by use of an interface 111 of the virtualization infrastructure 110. The interface 111 may comprise an API through which the virtualization infrastructure 110 publishes information pertaining to the storage resource(s) utilized and/or referenced within the system 100A, which may include, but is not limited to: information pertaining to the VMs 114A-N deployed on the computing device 101 (and/or other computing devices, not shown), the storage services 120 utilized and/or referenced by the VMs 114A-N (e.g., virtual disks and/or volumes 125A-N of the VMs 114A-N), deployment of new VMs 114A-N, shutdown of VMs 114A-N, migration of VMs 114A-N to/from the computing device 101, and/or the like. Alternatively, or in addition, the detector 152 may be configured to monitor I/O resources within the system 100A in order to, inter alia, detect changes to the I/O topology. In some embodiments, the detector 152 is configured to identify I/O requests pertaining to the VMs 114A-N by use of, inter alia, a driver deployed within the I/O stack of the computing device 101. The detection module 152 may detect the addition of a storage resource in response to identifying I/O request(s) directed to a new storage service 120 and/or pertaining to a new VM 114A-N in the I/O stack. Although particular mechanisms for identifying the addition of a storage resource are described herein, the disclosure is not limited in this regard and could incorporate any suitable mechanism for identifying changes to the I/O topology of the system 100A.

The cache automation module 150 may further comprise a configuration engine 154 that automatically configures caching services in response to identifying addition of a storage resource. In response to identifying the addition of a storage resource within the system 100A (and determining that cache services are to be enabled for the identified storage resource), the configuration agent may: a) configure the cache service 140 (and/or other components) to provision resources within the cache 141 to cache data of the identified storage resource and/or b) configure the cache service 140 (and/or other components) to identify I/O requests pertaining to the identified storage resource and to send the identified I/O requests to the cache service module 140. The configuration engine 154 may be further configured to configured a cache policy pertaining to the identified storage resource, which may determine a cache mode for the identified storage resource (e.g., write back, write through, ephemeral, and/or the like), may determine a file sharing cache configuration for the storage resource, and so on. Further embodiments of systems and methods for configuring and/or providing cache services are disclosed in U.S. patent application Ser. No. 14/245,893 entitled "Systems and Methods for Storage Virtualization," filed Apr. 4, 2014 for Jerene Zhe Yang et al., and U.S. patent application Ser. No. 13/829,358 entitled "Systems, Methods, and Interfaces for Adaptive Cache Persistence," filed Mar. 14, 2013 for Vikram Joshi et al., both of which are hereby incorporated by reference in their entirety.

In some embodiments, the cache automation module further comprises an automation policy 154 configured to, inter alia, determine whether to enable and/or configure caching services for storage resources in the system 100A. The cache automation module 150 may be configured to automatically configure caching services within the system 100A in accordance with the automation policy 154. The automation policy 154 may determine whether to enable cache services for a storage resource based on: characteristics and/or properties of the storage resources (e.g., whether the storage resource is a clustered shared storage resource accessible to a plurality of VMs 114A-N and/or VMs on other computing devices), characteristics and/or properties of the VM 114A-N associated with the storage resource (e.g., name of the VM 114A-N, VM identifier, VM type, and/or the like), characteristics and/or properties of applications associated with the storage resource, characteristics and/or properties of objects associated with the storage resource (e.g., files, database tables, and/or the like), and so on. In some embodiments, the automation policy 154 excludes storage services 120 that are accessed by VMs deployed on different computing devices 110 from caching services (to avoid data consistency issues). The automation policy 154 may be further configured to assign a relative priority to storage resources, VMs 114A-N, applications, objects, and/or the like, which may be used to provision (and/or re-provision) resources of the cache 141.

The cache automation module 150 may re-configure caching services in response to detecting the removal of a storage resource (by use of the detector 152). The detector 152 may identify the removal of a storage resource in response to one or more of: shutdown of a VM 114A-N, suspension of a VM 114A-N (e.g., hibernation, sleep, etc.), migration of a VM 114A-N to another computing device, removal of a virtual disk and/or volume 125A-N within a VM 114A-N, and/or the like. In response to identifying a removed storage resource, the configuration engine 154 may: a) de-provision resources provisioned to the corresponding VM 114A-N in the cache 141 and/or b) re-provision the resources to other VMs 114A-N and/or storage resources. The cache automation module 150 may be further configured to retain and/or transfer cache data of the VM 114A-N and/or storage volume. Further embodiments of systems and methods for managing cache state are disclosed in U.S. patent application Ser. No. 13/541,659, entitled "Systems, Methods, and Apparatus for a Virtual Machine Cache," filed Jul. 3, 2012 for Vikram Joshi et al., and U.S. patent application Ser. No. 13/687,979, entitled "Systems, Methods, and Apparatus for Cache Transfers," filed Nov. 28, 2012 for Vikram Joshi et al., both of which are hereby incorporated by reference in their entirety.

Figure 1B:
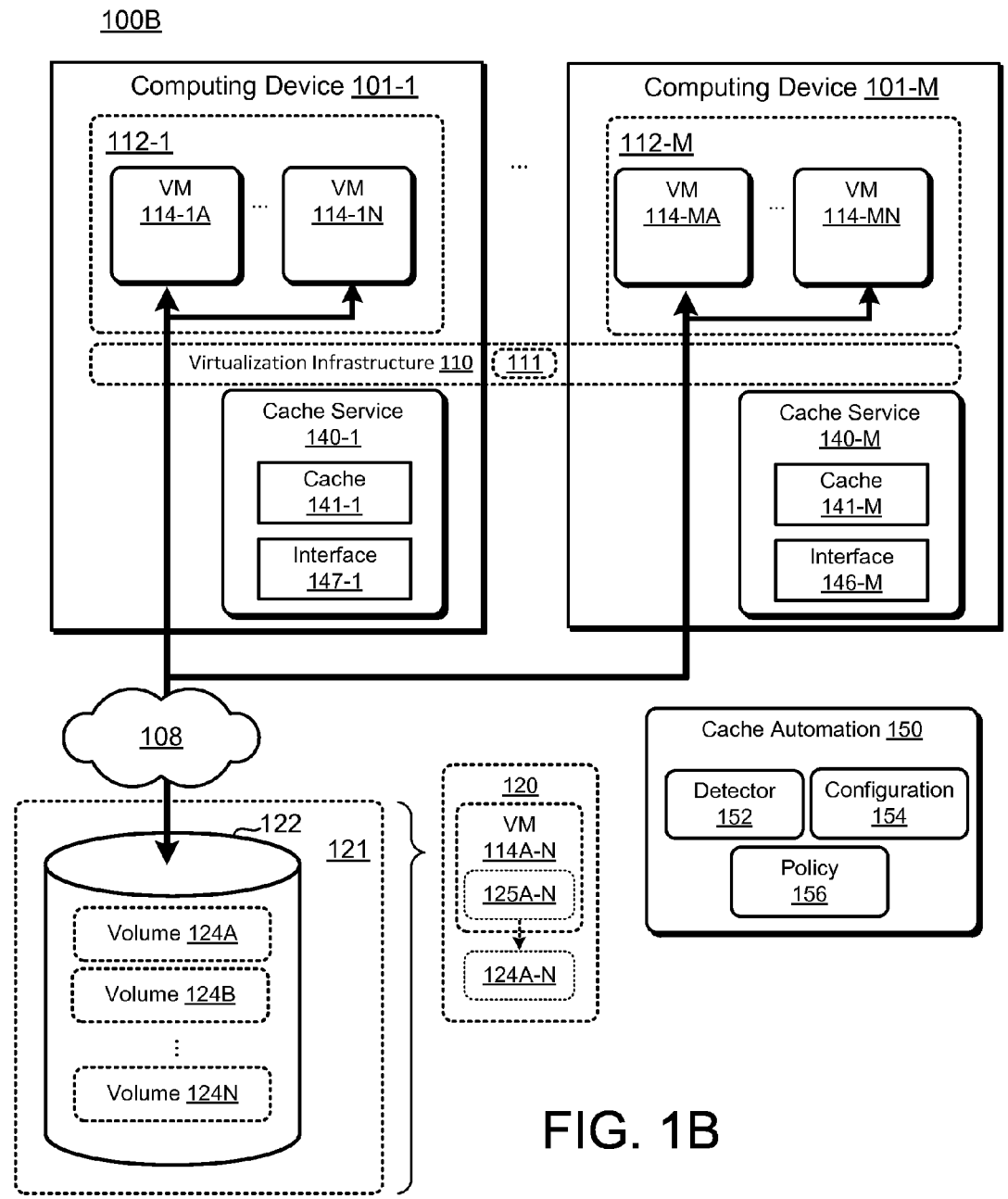
FIG. 1B is a block diagram depicting another embodiment of a system for automated I/O configuration.

Although FIG. 1A depicts the cache automation module 150 of the computing device 100, the disclosure is not limited in this regard; the cache automation module 150 may be implemented on a separate computing device external to the computing device 101. FIG. 1B illustrates another embodiment of a system 100B for automated I/O configuration. The system 100B comprises a plurality of computing devices 101-1, 101-M, each of which comprises a respective virtualization environment 112-1, 112-M capable of hosting respective sets of VMs 114-1A-N, 114-MA-N, as disclosed herein. The system 100B may further include virtualization infrastructure 114 configured to manage deployment of the VMs 114-1A-N, 114-MA-N within the respective virtualization environments 112-1, 112-M of the computing devices 101-1, 101-M. The virtualization infrastructure 110 may comprise a virtualization platform, a virtualization clustering infrastructure and/or platform, a virtualization center, and/or the like. The system 100B further comprises cache service modules 140-1, 140-M configured to provide caching services to the VMs 114-1A, 114-MN deployed on the respective computing devices 101-1, 101-M. The cache service modules 140-1, 140-M may be configured to identify I/O requests pertaining to storage resources associated with respective VMs 114-1A, 114-MN and to service the identified I/O requests using a respective cache 141-1, 141-M. The cache service modules 140-1, 140-M may further comprise a cache service interface module 147-1, 146-M capable of, inter alia, receiving configuration information pertaining to caching services implemented by the respective cache service 140-1, 140-M. The cache service interface module 147-1, 146-M may be adapted to receive configuration information that includes, but is not limited to configuration information pertaining to: the VMs 114-1A, 114-MN that are enabled for caching, designation of storage resources enabled for caching, cache mode for particular VMs 114-1A, 114-MN and/or storage resources, resource allocation directives (e.g., relative priority of VMs 114-1A, 114-MN and/or storage resources), and so on.

The cache automation module 150 may be configured to automatically configure cache services for the VMs 114-1A-N, 114-MA-N deployed within the system 100B. The cache automation module 150 may detect changes in the I/O topology of the system 100B by use of a detector 152. As disclosed above, the I/O topology of the system 100B refers to the set of storage resources utilized and/or referenced by the virtualization infrastructure 110, VMs 114-1A-N, 114-MA-N, and/or virtualization environments 112-1, 112-M of the system 100B, including the set of VMs 114A-N deployed within the system 110B and/or the storage services 120 utilized and/or referenced by the VMs 114A-N. Accordingly, in the FIG. 1B embodiment, the I/O topology of the system 100B comprises storage services 120 utilized and/or referenced by VMs 114-A-N, 114-MA-N deployed within a plurality of different virtualization environments 112-1, 112-M of a plurality of different computing devices 101-1, 101-M. The detector 152 of the cache automation module 150 may be configured to identify changes to the I/O topology by use of an interface 111 of the virtualization infrastructure 110, as disclosed herein. The detector 152 may be communicatively coupled to the virtualization infrastructure 110 (and/or interface 111) through the network 108. Alternatively, or in addition, the detector 152 (and/or the other components comprising the cache automation module 150) may be deployed on one of the computing devices 101-1, 101-M (e.g., on a computing device 101-1, 101-M on which the virtualization infrastructure 110 is deployed). The detector 152 may be further configured to identify the addition of storage resources within the system 100B by, inter alia, monitoring I/O requests within a storage stack of one or more of the computing devices 101-1, 101-M, as disclosed herein.

The configuration engine 154 of the cache automation module 150 may be adapted to automatically configure cache services implemented by the cache service modules 140-1, 140-M in response to changes to the I/O topology within the system 100B. In response to detecting the addition of a storage resource, the configuration engine 154 may be adapted to: a) identify the computing device 101-1, 101-M associated with the detected storage resource, and b) configure the corresponding cache service module 140-1, 140-M by use of, inter alia, the respective cache automation interface module 147-1, 146-M. The configuration engine 154 may configure the cache service module 140-1, 140-M in accordance with the automation policy 154, as described above.

Figure 1C:
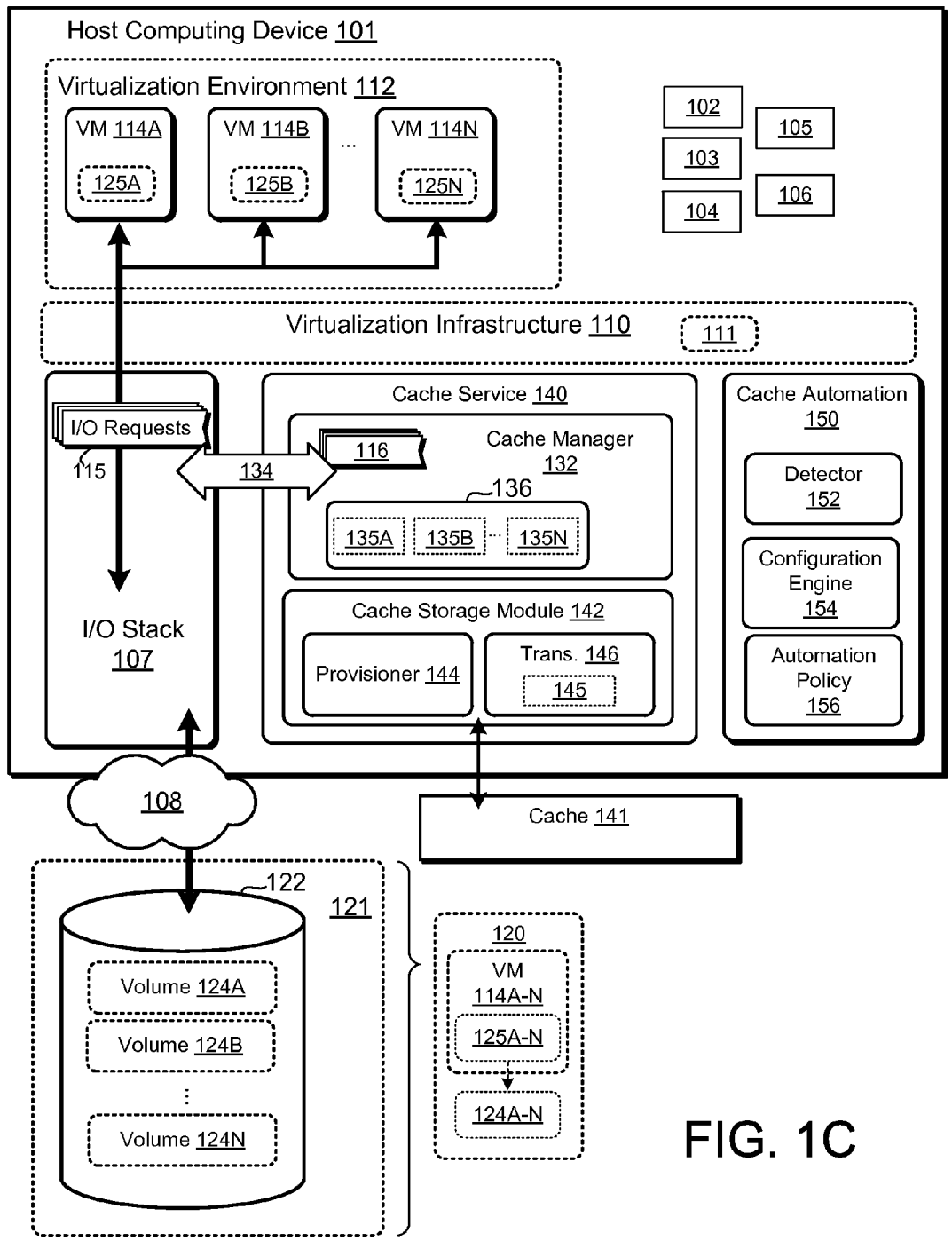
FIG. 1C is a block diagram depicting another embodiment of a system for automated I/O configuration.

FIG. 1C is a block diagram of another embodiment of a system 100C for automated I/O configuration. The FIG. 1C embodiment depicts a cache service module 140 configured to provide caching services to a plurality of VMs 114A-N deployed within the virtualization environment 112 of a computing device 101 (managed by the virtualization infrastructure 110). Although FIG. 1C depicts a single virtualization environment 112, the disclosure is not limited in this regard and could comprise any number of computing device(s) 101 comprising any number of virtualization environments 112 (as depicted in FIG. 1B).

In the FIG. 1C embodiment, the cache service module 140 provides caching services to the VMs 114A-N by use of, inter alia, a cache manager 132. The cache manager 132 may comprise a monitor 134 that identifies I/O requests 115 issued by particular VMs 114A-N and/or to particular storage services 120. The monitor 134 may be further configured to send and/or redirect I/O requests 116 pertaining to storage resource(s) that are being cached to the cache manager 132. The cache manager 132 may service the I/O requests 116 using the cache 141 (by use of the cache storage module 142, as disclosed in further detail herein).

The monitor 134 may be configured to intercept I/O requests 115 within the I/O stack 107 by use of, inter alia, APIs and/or libraries published by the base operating environment 106, the virtualization environment 112, the virtualization infrastructure 110, and/or the like. In some embodiments, the monitor 134 comprises a driver deployed and/or registered in an I/O "path" between the VMs 114A-N and the primary storage resource(s) 121 utilized by the VMs 114A-N. In one embodiment, the monitor 134 is configured to monitor I/O request packets (IRP) within the I/O stack 107 of a Microsoft WINDOWS® operating system. The disclosure is not limited in this regard, however, and may be used with any suitable I/O framework and/or I/O stack of any operating system (e.g., Unix®, LINUX, OSX®, Solaris®, or the like), virtualization environment 112, virtualization infrastructure 110, and/or virtualization platform.

The cache manager 132 may service selected I/O requests 116 by use of the cache 141, which may include, but is not limited to: admitting data into the cache 141, reading data from the cache 141, and/or the like. In some embodiments, the cache 141 comprises a storage resource that is local to the computing device 101 (e.g., is coupled to the computing device 101 by use of a bus, such as a SATA bus, a PCI bus, a storage bus, and/or the like). Alternatively, the cache 141 may be communicatively coupled to the computing device 101 through the network 108 or another communication and/or I/O mechanism.

The cache manager 132 may service I/O requests 116 by use of a cache storage module 142 configured to manage storage operations on the cache 141. The cache manager 132 may be configured to manage cache operations for a plurality of different VMs 114A-N deployed within the virtualization environment 112 of the computing device 101. Alternatively, the cache manager 132 may manage cache operations of a single VM 114A-N (e.g., the cache service module 140 may comprise a separate cache manager 132 for each VM 114A-N to which caching services are provided). Moreover, although in FIG. 1C the cache manager 132 is configured to operate within the base operating environment 106 of the computing device 101, the disclosure is not limited in this regard and, in other embodiments, the cache manager 132 may be configured for operation within one or more of the VMs 114A-N (e.g., within a guest operating system of a VM 114A-N).

The cache storage module 142 may include a provisioner 144 configured to manage allocation of cache storage resources to the VMs 114A-N. The provisioner 144 may be configured to adapt resource allocations in accordance with operating configurations on the computing device 101 and/or requirements of the VMs 114A-N (e.g., the I/O load on the VMs 114A-N). The provisioner 144 may be further configured to manage I/O bandwidth and/or I/O operations (IOPs) allocated to the VMs 114A-N in accordance with an allocation policy, which may include, but is not limited to, quality of service (QoS) requirements of one or more of the VMs 114A-N. The provisioner 144 may be configured to allocate cache capacity and/or IOPs to the VMs 114A-N in a manner that satisfies the QoS requirements of the VMs 114A-N. The provisioner 144 may be further configured to secure data stored in the cache 141 by, inter alia, preventing read-before-write security hazards, as disclosed in further detail herein.

The translation module 146 may be configured to manage a translation layer between cache storage resources provisioned to the VMs 114A-N (and accessible to the cache manager 132) and storage locations within the cache 141 (e.g., physical addresses). In some embodiments, the translation module 146 manages a virtual cache address space comprising virtual cache identifiers (virtual cache addresses). As used herein, a "virtual cache identifier" (VCID) refers to an identifier used to reference a cache storage location and/or address indirectly, through a translation layer. A VCID, therefore, may not directly reference a cache storage location (e.g., may not be a physical address on the cache 141). In some embodiments, the translation module 146 associates VCIDs with cache storage locations by use of translation metadata 145. As disclosed in further detail herein, the translation metadata 145 may comprise a forward map and/or index that associates VCIDs provisioned to a VM 114A-N with respective storage locations within the cache 141.

As disclosed above, the provisioner 144 may allocate cache resources to respective VMs 114A-N by, inter alia, assigning sets, groups, ranges, and/or extents of virtual cache addresses to the VMs 114A-N. The cache manager 132 may represent a state of the cache of a particular VM 114A-N by use of a corresponding set of data tags 135A-N. The set of data tags 135A-N maintained for a particular VM 114A-N may correspond to the cache resources provisioned to the particular VM 114A-N. Accordingly, each data tag in the set 135A-N may correspond to a cache storage location (e.g., cache line) available to cache data pertaining to a storage service 120 referenced by the VM 114A-N.

Figure 2:
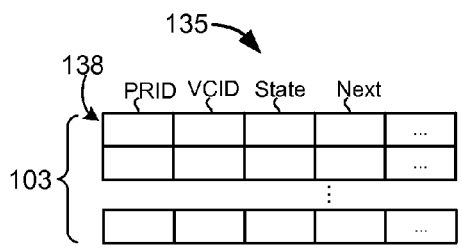
FIG. 2 depicts embodiments of cache metadata.

FIG. 2 depicts embodiments of cache metadata 136, including embodiments of a set 135 of data tags 138. As used herein, a "data tag" 138 refers to metadata configured to represent data pertaining to a storage resource within the cache manager 132. A data tag 138 may, therefore, comprise and/or represent a cache entry, cache tag, cache line, and/or the like. A data tag 138 may be configured to identify data that has been admitted into the cache 141 and/or indicate an address and/or storage location of the data within the cache 141 (e.g., by use of an indirect VCID, as disclosed herein). A data tag 138 may be configured to represent data pertaining to a storage resource, such as a page, a block, a sector, or the like. The cache manager 132 may use data tags 138 to represent cache storage location(s), such that each data tag 138 corresponds to a respective cache storage location. Accordingly, the data tags 138 allocated to a VM 114A-N may represent the cache capacity available for caching data pertaining to the VM 114A-N.

As illustrated in FIG. 2, a data tag 138 may comprise one or more fields, including, but not limited to: a primary identifier (PRID) field, a VCID field, a state field, a next field, and so on. The PRID field may comprise information configured to tie the data tag 138 to a primary storage resource 121. As used herein, a PRID refers to an identifier used by a VM 114A-N, an I/O stack 107, the virtualization infrastructure 110, and/or a computing device 101 to reference data associated with a primary storage resource 121. A PRID may, therefore, comprise and/or be derived from an identifier and/or address of data on a storage system 122 and/or a volume 124A-N, such as a logical block address, a physical address, a cylinder sector head address, a Uniform Resource Locator (URL), a logical identifier, a logical block address, and/or the like.

As illustrated in FIG. 1C, the cache manager 132 may be configured to service I/O requests 116 of a plurality of different VMs 114A-N and, as such, may maintain separate sets of data tags 135A-N corresponding to each VM 114A-N. Accordingly, in some embodiments, the PRID assigned to data stored in the cache 141 may further include and/or incorporate a VM identifier (VMID) of the corresponding VM 114A-N. As used herein, a VMID refers to any identifier used to identify and/or distinguish a VM 114A-N within the virtualization infrastructure 110 and/or the virtualization environment 112. In some embodiments, VMIDs may be used to distinguish data of different VMs 114A-N and/or to prevent unauthorized access to VM data. The VMID of a VM 114A-N may be assigned by the virtualization infrastructure 110, the virtualization environment 112, and/or the computing device 101 and/or may be generated within the respective VMs 114A-N and/or the like.

The VCID field may comprise a virtual cache identifier, which may be mapped to a cache storage location (e.g., physical cache address) by the translation module 146. In some embodiments, the data tags 138 maintained by the cache manager 132 may correspond to a set of contiguous VCIDs. Accordingly, the VCID of a particular data tag 138 may be determined based on the offset and/or location of the data tag 138 in memory (in the memory resources 103 of the computing device 101). A first data tag 138 in the set 135 (stored at memory offset 0) may correspond to virtual address 0, a second data tag 138 in the set 135 may correspond to virtual address 1, and so on. In such embodiments, the VCID field may be omitted from the data tag 138 data structure and/or derived from a memory offset within the data tag set 135. In some embodiments, the VCID allocated to a VM 114A-N may comprise a virtual namespace, specific to the particular VM 114A-N. The VCIDs allocated to a VM 114A-N may, for example, incorporate a VMID of the VM 114A-N and/or other VM-specific information.

The state field may comprise information pertaining to a current state of the data tag 138, such as whether the data tag 138 is currently in use to reference cached data, is dirty, is discardable, has been backed up to primary storage, and so on. The state field may further include information pertaining to access and/or usage characteristics of the data tag 138 (e.g., read access characteristics, write access characteristics, last access time, access frequency, and so on), which may be used to, inter alia, identify data for eviction from the cache 141. In some embodiments, the state field may be further configured to identify the VM 114A-N that originally admitted the data corresponding to the data tag 138 into the cache 141, which may be used to prevent read-before-write conditions (e.g., prevent VM 114A from reading data admitted into the cache by another VM 114B-N). The state field may be further configured to indicate characteristics of the data tag 138, such as a persistence level, that may determine the cache mode for the data tag 138 (e.g., write-through, write-back, write-never (ephemeral or write-vectored), removal trigger conditions, and/or the like). The next field of the data tag 138 may comprise a link and/or a reference to a next data tag 138 in the set 135. In embodiments where the data tags 138 are arranged in memory resource 103 in a predetermined manner (stored contiguously), the next field may be omitted (e.g., may be derived from an offset from a current tag 138). Further embodiments of cache management systems and/or corresponding cache metadata are disclosed in U.S. patent application Ser. No. 13/028,149, entitled "Systems and Methods for Managing I/O Operations," filed Feb. 15, 2011, for Vikram Joshi et al., which is hereby incorporated by reference in its entirety.

As disclosed above, in some embodiments, the data tags 138 may reference cache resources indirectly through VCIDs (e.g., indirect addresses). The VCIDs may be mapped to cache storage locations by use of the translation module 146. The cache manager 132 and/or provisioner 144 may leverage the intermediate mapping layer implemented by the translation module 146 to allocate contiguous ranges and/or extents of VCIDs to VMs 114A-N, regardless of the layout and/or configuration of the corresponding physical addresses within the cache 141.

Figure 3:
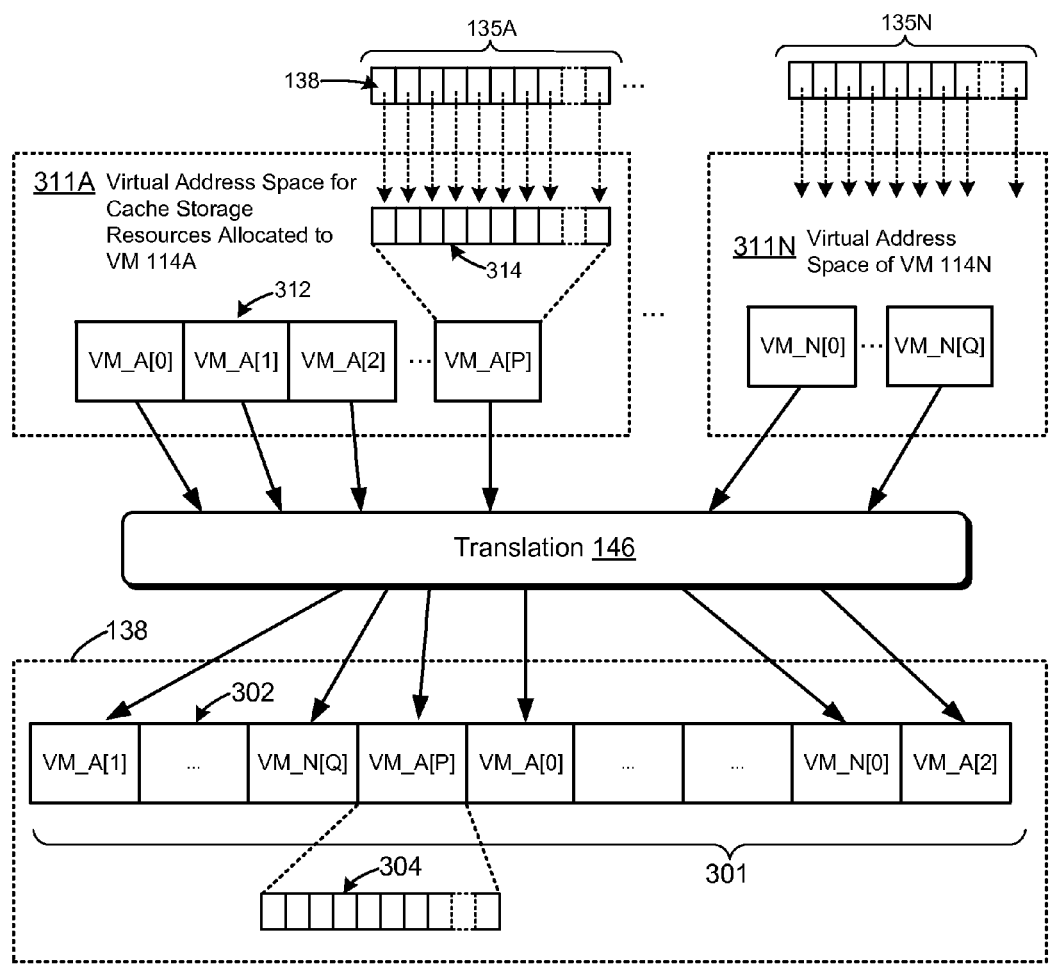
FIG. 3 depicts embodiments of a cache translation layer.

FIG. 3 depicts further embodiments of metadata 147 corresponding to a translation layer between VCIDs 314 of the data tags 138 and cache storage locations 304 within the cache 141. In the FIG. 3 embodiment, the cache 141 comprises a plurality of cache storage locations 304, which may correspond to pages, blocks, sectors, storage divisions, erase blocks, logical pages (e.g., two or more pages), and/or the like. The provisioner 144 may be configured to partition the storage capacity of the cache 141 into a plurality of chunks 302. As used herein, a chunk refers to an arbitrarily sized portion of storage capacity. A chunk 302 may comprise a set, a range, and/or an extent of cache storage locations 304. In a particular embodiment, each chunk 302 corresponds to 256 MB (megabytes) of storage capacity, such that a cache 141 having a capacity of 1 TB (terabyte) is divided into 4,192 chunks 302.

The provisioner 144 may allocate cache resources (chunks 302) within a physical address space 301 of the cache 141. Chunks 302 may be selected for allocation to a particular VM 114A-N based on one or more of: availability, media wear characteristics, media reliability characteristics, and/or the like. Accordingly, the chunks 302 allocated to a particular VM 114A-N may be fragmented and/or disjoint with respect to the physical address space 301 of the cache 141 (e.g., the chunks 302 may correspond to discontiguous and/or disjointed regions of the physical address space 301 of the cache 141). In the FIG. 3 embodiment, the cache manager 132 has allocated chunks VM_A[0]-VM_A[P] to VM 114A, has allocated chunks VM_N[0]-VM_N[Q] to VM 114N, and so on. As illustrated in FIG. 3, the chunks 302 allocated to VM 114A and VM 114N are discontiguous/disjointed within the physical address space 301 of the cache 141.

The translation module 146 provides a translation layer between the physical address space 301 of the cache 141 and VCIDs 314 by use of the index illustrated in FIG. 3. The VCIDs 314 may be exposed to the cache manager 132 as respective virtual address space(s) 311A-N provisioned to particular VMs 114A-N. As used herein, an "address space" or a "virtual address space" refers to a namespace comprising a set, a group, a range, and/or an extent of identifiers to reference storage resources (e.g., a group, a set, a range, and/or an extent of VCIDs 314), which correspond to chunks 302 and/or storage locations 304 in the cache 141. In the FIG. 3 embodiment, the virtual address space(s) 331A-N provisioned to the VMs 114A-N comprise sets of VCIDs 314 capable of being mapped to respective cache storage locations 304. The independent mapping layer implemented by the translation module 146 may enable the provisioner 144 to allocate contiguous sets of VCIDs 314 within respective virtual address spaces 311A-N regardless of the layout and/or arrangement of the underlying chunks 302 in the physical address space 301 of the cache 141. In some embodiments, the size of the virtual address space 311A-N provisioned to a VM 114A-N corresponds to the amount of storage capacity allocated to the VM 114A-N by the provisioner 144 (e.g., the number of VCIDs in the virtual address space 311A-N). Alternatively, the virtual address space 311A-N may be thinly provisioned, such that the storage capacity represented by the virtual address space 311A-N is larger than the physical storage capacity provisioned to the VM 114A-N. The disclosure is not limited in this regard, however, and could be adapted to manage virtual addresses and/or namespaces in other ways, such as allocating contiguous ranges of VCIDs 314 to the VMs 114A-N within a single logical and/or virtual address space.

As disclosed above, the cache manager 132 may be configured to manage caching services for a VM 114A-N by use of a set of data tags 135A-N. The cache manager 132 may allocate the set of data tags 135A-N for a VM 114A-N in accordance with the cache resources provisioned to the VM 114A-N by the provisioner 144. The cache manager 132 may, for example, maintain a data tag 138 for each VCID 314 provisioned to the VM 114A-N. As illustrated in FIG. 3, the data tags 138 may correspond to respective VCIDs 314 through a VCID field of the data tags 138, a relative offset of the data tags 138 in the data tag set 135 (e.g., memory offset), and/or by use of another association mechanism. The translation module 146 is configured to translate VCIDs 314 associated with the data tags 138 to respective storage units 304 of the cache 141. As disclosed above, the data tags 138 may be organized linearly in RAM or other memory resources 103 of the computing device 101 (and/or VM 114A-N), which may allow the VCID 314 of a data tag 138 to be derived from a memory location and/or offset of the data tag 138 in the data tag set 135 (e.g., based on the assumption that each data tag 138 has a linear 1:1 correspondence with a virtual address and/or a cache storage location 304). Alternatively, or in addition, data tags 138 may be organized into another data structure, such as a hash table, a tree, or the like.

Figure 1D:
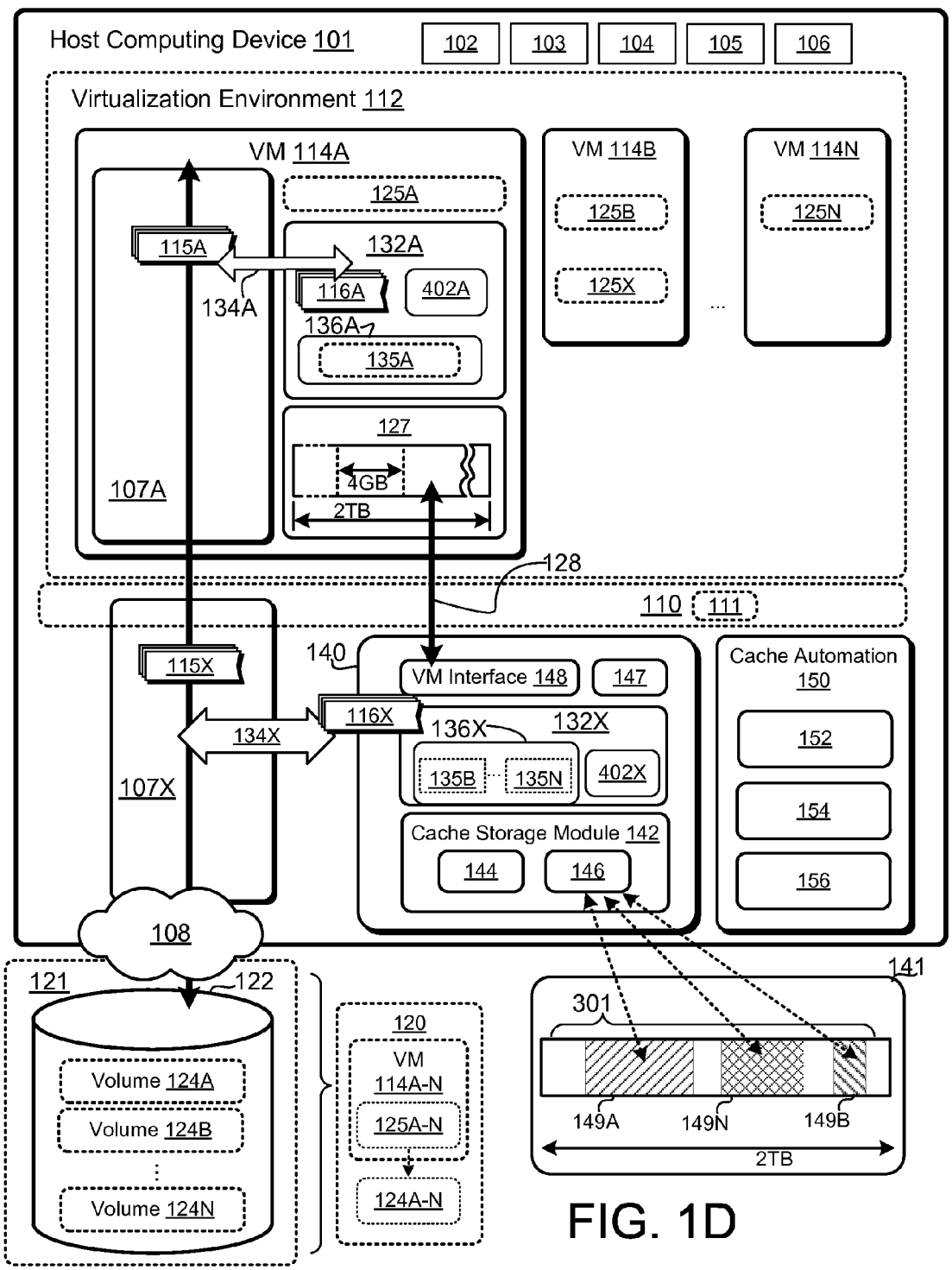
FIG. 1D is a block diagram depicting another embodiment of a system for automated I/O configuration.
Figure 4:
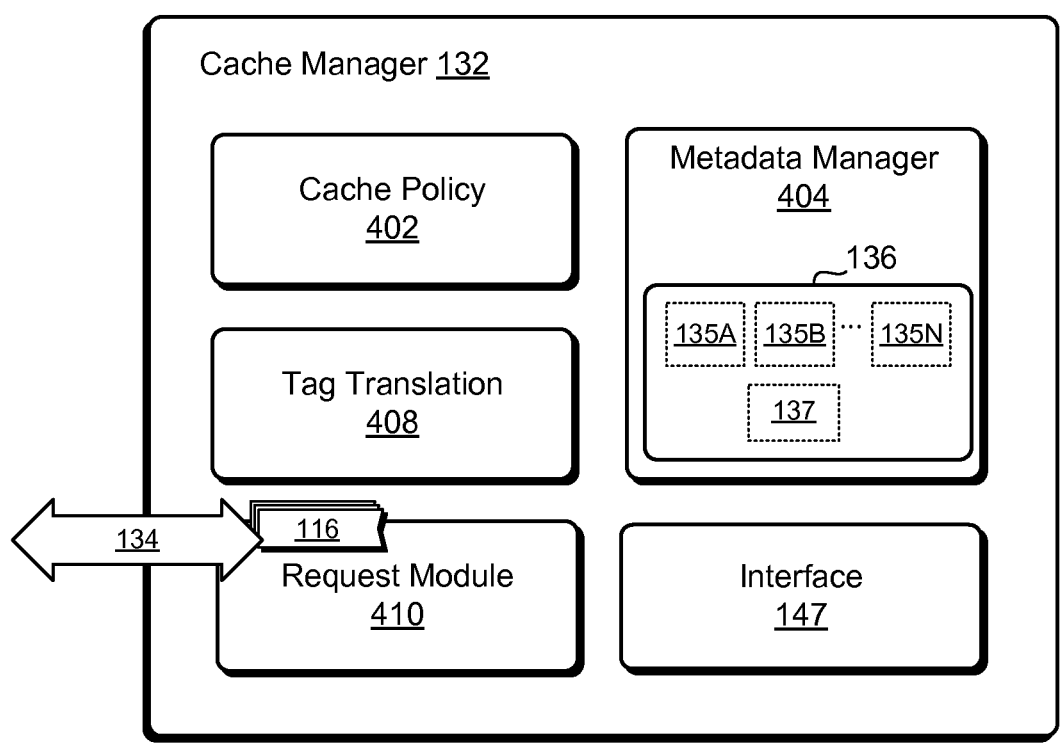
FIG. 4 is a block diagram that depicts one embodiment of a cache manager.

FIG. 4 is a block diagram depicting one embodiment of a cache manager 132. The cache manager 132 may be configured for operation within the base operating environment 106 of the computing device 101 (as depicted in FIG. 1A) and/or within a VM 114A-N (as depicted in FIG. 1D). The cache manager 132 may include a cache policy module 402 configured to, inter alia, select data for admission into the cache 141, evict data from the cache 141, identify storage resources for caching services (e.g., identify VMs 114A-N and/or storage services 120 for which caching services are to be provided), and so on. In some embodiments, the cache policy module 402 manages the monitor 134 in order to, inter alia, identify I/O requests 116 to the cache manager 132. In some embodiments, the cache policy module 402 configures, initializes, and/or activates monitor(s) 134 within an I/O stack 107 to identify I/O requests 115 to redirect to the cache manager 132. Alternatively, or in addition, the cache policy module 402 may invoke and/or deploy new monitor(s) 134 within the I/O stack 107 of the computing device 101, as disclosed herein.

A metadata manager 404 may be configured to manage metadata 136 pertaining to I/O cache operations implemented by the cache manager 132. The metadata 136 may include, but is not limited to, one or more sets 135A-N of data tags 138. As disclosed above, the data tag sets 135A-N may comprise VCIDs provisioned to respective VMs 114A-N that are capable of being mapped to storage locations 304 within the cache 141. Accordingly, the metadata manager 404 may allocate the sets of data tags 135A-N for the VMs 114A-N accordance with the storage capacity provisioned to the VMs 114A-N by the provisioner 144.

The metadata manager 404 may be further configured to maintain access metrics 137 pertaining to the data admitted into the cache 141 (and/or other data of a storage service 120 that has not been admitted into the cache). The access characteristics 137 maintained by the metadata manager 404 may include, but are not limited to: access frequency, last access time (e.g., least recently used), time since last access, sequentiality, and so on. The cache policy module 402 may be used to access metrics 137 to select data for admission and/eviction, manage cache tag allocations, configure the monitor 134, and so on.

The cache manager 132 may further comprise a tag translation module 408 configured to correlate PRIDs with respective data tags 138 in a data tag set 135A-N associated with a VM 114A-N. Accordingly, the tag translation module 408 may be configured to: a) determine whether a particular PRID corresponds to data that has been admitted into the cache 141 (based on whether a data tag associated with the particular PRID exists in the data tag set 135A-N, and b) determine a VCID associated with the particular PRID. VCIDs associated with the data tags 138 maintained by the metadata manager 404 may be mapped to data stored in the cache 141 by the translation module 146, as disclosed above (e.g., by mapping the VCID to a storage location 304 in the physical address space 301 of the cache 141).

The cache manager 132 may further comprise a request module 410 configured to service I/O requests 116 directed to the cache manager 132. The request module 410 may be configured to service an I/O request 116 by: a) determining if the I/O request 116 pertains to data admitted into the cache 141, and if so, b) servicing the I/O request 116 by use of the cache 141 or c) determining whether to admit data of the I/O request 116 into the cache 141 by use of the cache policy module 402. The request module 410 may determine whether data of the I/O request 116 has been admitted into the cache 141 by: a) referencing the PRID associated with the I/O request 116 and b) determining if the set of data tags 135A-N of the corresponding VM 114A-N comprises a data tag 138 with the referenced PRID. Servicing a read I/O request 116 may further comprise reading data from the cache 141 by use of cache storage module 142 (using the VCID of the data tag 138 corresponding to the referenced PRID). Servicing a write I/O request 116 may comprise writing data to the cache 141 by use of the cache storage module 142. In some embodiments, servicing the write I/O request 116 further comprises writing the data to a primary storage resource 121 associated with the I/O request 116 in accordance with a cache mode assigned to the I/O request 116. As disclosed above, the cache policy 402 may define a cache mode for particular storage resources (e.g., particular VMs 114A-N and/or storage services 120). The cache mode assigned to an I/O request 116 may include, but is not limited to: a write-through cache mode, a write-back cache mode, an ephemeral cache mode (write-never, write-vectored cache mode), and/or the like). In a write-through cache mode, the cache manager 132 may be configured to write data of the I/O request 116 to both the cache 141 and primary storage resource 121. The cache manager 132 may acknowledge completion of the I/O request 116 in response to writing the data to the corresponding primary storage resource 121. In a write-back cache mode, the cache manager 132 may acknowledge completion of the I/O request 116 in response to writing the data to the cache 141. The data may be marked as "dirty" or "non-discardable" until the data is written to the primary storage resource 121. In a write-never, write-vectored, or ephemeral storage mode, the cache manager 132 may write data of the I/O request 116 exclusively to the cache 116 without writing the data to the primary storage resource 121. Further embodiments of systems, methods, and interfaces for ephemeral storage and/or assigning cache modes to I/O requests 116 are disclosed in U.S. patent application Ser. No. 14/245,893 entitled "Systems, Methods, and Interfaces for Adaptive Cache Persistence," filed Apr. 4, 2014 for Jerene Zhe Yang et al., which is incorporated by reference in its entirety.

The cache manager 132 may further comprise an interface module 147 configured to receive and/or implement cache configuration information provided by, inter alia, the provisioner 144 and/or cache automation module 150. In some embodiments, the interface module 147 is configured to receive information pertaining to cache resources provisioned to the VMs 114A-N by the provisioner 144. The cache manager 132 may be configured to adjust the size of one or more data tag sets 135A-N based on cache resource allocations (by use of the metadata manager 408), which may comprise: a) adding data tags 138 to a particular data tag set 135A-N, b) removing data tags 138 from a particular data tag set 135A-N, c) removing an entire set of data tags 135A-N, d) preserving a set of data tags 135A-N (for a cache state transfer and/or snapshot operation), and/or the like.

Referring back to FIG. 1C, the system 100C may further comprise a cache automation module 150. The cache automation module 150 may be configured to automatically configure caching services in response to changes to the I/O topology of the system 100C. As disclosed above, a change in the I/O topology of the system 100C may correspond to a change in the storage resources utilized and/or referenced by VMs 114A-N deployed within the virtualization infrastructure 112 and, as such, may result from changes to VM deployment and/or storage services 120 utilized and/or referenced by VMs 114A-N deployed in the system 100C. The detector 152 may be configured to identify changes to the I/O topology by use of the interface 111 of the virtualization infrastructure 110; monitoring the I/O stack 107; monitoring events published by the virtualization infrastructure 110, the virtualization environment 112, and/or the base operating environment 106; and/or the like. An I/O topology change may result from one or more of: a) deploying a VM 114A-N on the computing device 101, b) a deployed VM 114A-N utilizing and/or referencing a storage service 120 through a virtual disk and/or volume 125A-N, and/or c) the like. As disclosed above, deploying a VM 114A-N on the computing device 101 may comprise one or more of: a) creating a VM 114A-N, b) booting a VM 114A-N, c) resuming a VM 114A-N (e.g., restarting a VM 114A-N, resuming from sleep or hibernation, and/or the like), d) transferring a VM 114A-N to the computing device 101 from another host, and/or the like. Utilizing and/or referencing a storage service 120 may comprise one or more of: a) creating a new virtual disk and/or volume 125A-N associated with a storage service 120 (e.g., volume 124A-N), b) defining a new virtual disk and/or volume 125A-N, c) initializing a new virtual disk and/or volume 125A-N, d) accessing a new virtual disk and/or volume 125A-N, and/or the like.

In response to detecting the addition of a storage resource in the system 100C, the cache automation module 150 may be configured to determine a cache configuration by use of the automation policy 154. The cache configuration may determine, inter alia, whether to enable caching services for the detected storage resource, a cache mode for the storage resource, a resource priority and/or QoS for the storage resource, and/or the like. The cache configuration maintained by the automation policy 154 may be embodied on a non-transitory, computer-readable storage medium in a data structure, record, table, and/or the like, such as registry settings, database records, directory entries, a file, a structured file (e.g., XML), and/or the like. The automation policy 154 may comprise cache criterion to determine whether to enable caching services for particular storage resources (e.g., particular VMs 114A-N and/or storage services 120). As disclosed above, the criterion may include, but is not limited to: storage resource type (e.g., clustered, shared, etc.), characteristics and/or properties of the VM 114A-N associated with the detected storage resource, characteristics and/or properties of application(s) configured to access the detected storage resource, characteristics and/or properties of object(s) (e.g., files) stored on the detected storage resource (e.g., stored and/or maintained on the storage service 120), QoS requirements of VMs 114A-N deployed within the virtualization environment, load, resource availability, and so on.

In response to detecting an additional storage resource, the configuration engine 154 may automatically configure caching services in accordance with the automation policy 154, described above. If caching services are to be enabled, the configuration engine 154 may configure the cache service 140 to identify I/O requests 116 pertaining to the storage resource, which may comprise configuring the monitor 134 to redirect I/O requests 115 sent to the detected storage resource to the cache manager 132 by, inter alia, identifying I/O requests 115 pertaining to a particular VM 114A-N and/or pertaining to a particular storage service 120. The configuration engine 154 may be further configured to instruct the cache service module 140 to provision cache resources to the corresponding VM 114A-N and/or assign a cache mode to the VM 114A-N and/or detected storage resource, as disclosed herein.

FIG. 1D depicts another embodiment of a system 100D for automated I/O configuration. In the FIG. 1D embodiment, a cache manager 132A is deployed within VM 114A. The cache manager 132A may be configured to manage cache operations for the VM 114A. Cache operations pertaining to other VMs 114B-N may be managed by respective cache managers deployed therein (not shown), and/or the cache manager 132X deployed within the base operating environment 106 of the computing device 101. In embodiments in which the VMs 114A-N comprise a respective cache manager (e.g., 132A-N), the cache manager 132 deployed within the base operating environment 106 may be omitted.

As disclosed above, the cache manager 132X may be configured to manage cache operations for VMs 114B-N deployed within the virtualization environment 112, as disclosed herein. The cache manager 132X may be configured to maintain corresponding data tag sets 135B-135N corresponding to the cache resources allocated to the VMs 114B-N by the provisioner 144. The cache manager 132X may further comprise a monitor 134X configured to filter I/O requests 115X within the I/O stack 107X of the virtualization environment 112 and/or base operating environment 106 to identify I/O requests 116X pertaining to the VMs 114B-N (e.g., I/O requests 116X sent to storage service 120 utilized and/or referenced by the VMs 114B-N). The monitor 134X may be further configured to redirect selected I/O requests 116X to the cache manager 132X, which may service the I/O requests 116X using the cache 141. The cache manager 132X may selectively admit data corresponding to the I/O requests 116X into the cache 141 and associate the cached data with respective data tags 138 (of one or more of the data tag sets 135A-N) in accordance with the persistence level and/or cache mode assigned to the I/O requests 116X by the cache policy 402X, as disclosed herein.

The system 100D further comprises a cache manager 132A deployed within the VM 114A (operating within the guest operating system of the VM 114A). The cache manager 132A may be configured to manage cache storage operations for the VM 114, as disclosed herein, which may comprise: a) filtering I/O requests 115A within an I/O stack 107A of the VM 114A, b) identifying I/O requests 116A pertaining to cached storage services 120 (by use of a monitor 134A), and c) servicing the I/O requests 116A using the cache 141 (through the cache storage module 142). The cache manager 132 may be further configured to maintain cache metadata, including a data tag set 135A comprising data tags 138 corresponding to the cache resources provisioned to the VM 114A.

The cache service module 140 may further comprise a VM interface module 148 configured to communicatively couple the cache service module 140 and the cache manager 132A operating within the VM 114A. The VM interface module 148 may be configured to present and/or expose the cache storage resources provisioned to the VM 114A through, inter alia, a virtual storage service 127, which may comprise and/or correspond to one or more of a virtual disk, a virtual machine disk format (VMDK), a virtual volume, vLUN storage resource, and/or the like. The monitor 134A may be configured to communicate cache configuration information to/from the cache manager 132A through, inter alia, through the virtual storage service 127, forming a communication link 128 to/from the cache manager 132A.

In some embodiments, the VM interface 148 represents dynamically provisioned cache resources as fixed-size virtual storage service 127 within the VM 114A. In one embodiment, the cache 141 comprises 2 TB of storage capacity, and the provisioner 144 allocates four gigabytes (4 GB) of physical cache capacity 149A to the VM 114A. Other VMs 114B-N may be allocated different amounts of cache capacity, in accordance with, inter alia, the I/O requirements of the VMs 114A-N and/or the availability of cache resources (VM 114B may be allocated 1 GB 149B, and VM 114N may be allocated 3 GB149N). The VM interface 148 may configure the virtual storage service 127 to represent the entire capacity of the cache 141 to the VM 114A (e.g., 2 TB) regardless of the actual allocation of VCIDs to the VM 114A. Moreover, the physical cache resources 149A-N allocated to the VMs 114A-N may be disjoint and/or non-contiguous within the physical address space 301 of the cache 141. The physical storage resources 149A-N may be mapped to the respective VMs 114A-N (and corresponding VCIDs) by the translation module 146, as disclosed herein.

The virtualization infrastructure 110 may be capable of transferring VMs 114A-N from the computing device 110 to a virtualization environment 112 on another computing device (not shown), without powering down and/or resetting the transferred VMs 114A-N. Such transfer operations may be simplified when the VMs 114A-N reference shared resources as opposed to "local" resources of the computing device 101, since the VMs 114A-N will be able to access the same resources after being transferred. However, VMs 114A-N that rely on local resources (e.g., resources only available on the particular computing device 101) may be prevented from being transferred. The cache service module 140 may, therefore, configure the virtual storage service 127 to emulate a shared storage resource within the virtualization environment 112 and/or the virtualization infrastructure 110, which may not prevent the VM 114 from being transferred between host computing devices (e.g., does not prevent the VM 114A from being migrated from the computing device 101 to another computing device). As disclosed above, the virtual disk (virtual storage resource 127) may be presented as a fixed-size storage resource within the VM 114A. In other embodiments, the virtual storage service 127 may be represented as a relatively small disk (e.g., a few megabytes), since the virtual storage service 127 is not used for actual data storage, but as a conduit for communication between the VM 114A and the cache service module 140. Alternatively, or in addition, the virtual storage service 127 may be hidden from other applications and/or operating systems of the VM 114A and/or may be presented to the VM 114A as a read-only device, and as such, the operating system of the VM 114A may prevent other applications from writing data thereto.

The VM interface 148 may emulate shared storage within the VM 114A using other mechanisms and/or techniques. For example, in some embodiments, the VM 114A may be configured to replicate one or more "shared" vLUN disks across a plurality of computing devices 101 in a cluster, such that, to the computing devices 101 in the cluster, the vLUN disks appear to be shared devices. For instance, the virtual storage resource(s) 127 presented with the VM 114 (and/or other VMs 114B-N on other hosts) may share the same serial number or other storage resource identifier. The virtualization environment 112 and/or the virtualization infrastructure 110 may, therefore, treat the virtual storage service 127 as a shared device, and allow the VM 114A to be transferred within the cluster. Further embodiments of systems and methods for managing transfers of VMs 114A-N to/from the computing device 101 are disclosed in U.S. patent application Ser. No. 13/541,659, entitled "Systems, Methods, and Apparatus for a Virtual Machine Cache," filed Jul. 3, 2012 for Vikram Joshi et al., and U.S. patent application Ser. No. 13/687,979, entitled "Systems, Methods, and Apparatus for Cache Transfers," filed Nov. 28, 2012 for Vikram Joshi et al., both of which are hereby incorporated by reference in their entirety.

The VM interface 148 may be further configured to communicate provisioning (and/or other cache configuration information) to the cache manager 132A through the communication link 128. The monitor 134A may comprise an I/O driver, a filter, and/or the like configured to provide for communicating configuration, command, and/or control data to/from the cache manager 132A through the communication link 128 provided by an I/O filter of the monitor 134 and/or the virtual storage service 127. In some embodiments, the communication link 128 operates separately from I/O data traffic between the virtual storage service 127 and the corresponding virtual storage resource driver (vLUN and/or VMDK driver of the VM interface 148), which may enable asynchronous, out-of-band messages to be sent to/from the cache manager 132A through the communication link 128. The provisioner 144 may use the communication link 128 to dynamically re-provision and/or reallocate cache resources to the VMs 114A-N, as disclosed herein. The provisioner 144 may be further configured to inform the cache manager(s) 132A and/or 132X of the changes to cache resource allocations. The VM interface 148 may report allocation information pertaining to VM 114A to the cache manager 132A through the communication link 128. The cache manager 132A may use the allocation information to determine the number of data tags 138 to maintain in the data tag set 135A, as disclosed herein. Although not depicted in FIG. 1D, the provisioner may communicate allocation information to other cache manager(s) operating within respective VMs through similar communication links (e.g., through respective virtual storage resource(s) presented within the respective VMs by the VM interface 148).

The cache manager 132X may be configured to provide caching services to VMs 114B-N by use of the cache service module 140 and/or cache storage module 142. The cache manager 132X may filter I/O requests 115X in the storage stack 107X to identify I/O requests 116X pertaining to cached storage resources by use of the monitor 132X (e.g. identify I/O requests 116X pertaining to particular VMs 114B-N and/or storage services 120). The cache manager 132X may service the identified I/O requests 116X by use of the cache 141 (e.g., through the cache service module 140 and/or cache storage module 142), as disclosed herein.

The cache manager 132A may be configured to provide caching services to the VM 114A by use of the cache service module 140 and/or the cache storage module 142. The cache manager 132A may filter I/O requests 115A in the I/O stack 107X of the VM 114A to identify I/O requests 116A pertaining to cached storage resources, by use of the monitor 134A (e.g., identify I/O requests 116A pertaining to virtual volumes 125A configured for caching services as defined by, inter alia, the cache policy 402A of the cache manager 132A). The monitor 134A may be configured to redirect and/or forward the identified I/O requests 116A to the cache manager 132A, which may service the I/O requests 116A. Servicing an I/O request 116A may comprise: a) referencing a data tag 138 corresponding to a PRID associated with the I/O request 116A in the data tag set 135A, and b) forwarding the I/O request 116A to the cache service module 140 with the VCID of the referenced data tag 138 (if any). The cache manager 132A may be further configured to assign a persistence level and/or cache mode to the forwarded I/O request 116A in accordance with the cache policy 402A (e.g., by tagging the forwarded I/O request 116A with metadata indicating the assigned cache mode). If no data tag 138 corresponding to the I/O request 116A exists in the data tag set 135A, the cache manager 132A may determine whether to admit data of the I/O request 116A into the cache 141 based on the cache policy 402A, the availability of data tags 138 in the set 135A, and/or the like. As disclosed above, an "available" data tag 138 refers to a data tag 138 that is not currently in use to reference cached data of a storage resource (e.g., is not associated with a PRID). The cache manager 132A may make data tags 138 available by, inter alia, evicting data from the cache 141, requesting additional cache capacity from the provisioner 144 (through the communication link 128), and/or the like. If data of the I/O request 116A is to be admitted into the cache, the cache manager 132A may forward the I/O request 116A to the cache service module 140 with the VCID corresponding to the newly allocated data tag 138. As disclosed above, a cache mode may correspond to one or more of: write through, write back, write never (ephemeral), and/or the like.

The cache service module 140 may receive the I/O request 116A forwarded from the cache manager 132A through the virtual storage service 127 and/or communication link 128 and, in response, may read and/or write data to the corresponding cache storage location by, inter alia, mapping the VCID associated with the I/O request 116A to a cache storage location 304 by use of the cache storage module 142. In response to cache read miss (e.g., a request to read data not yet stored in the cache 141), the cache storage module 142 may access the requested data in the corresponding storage resource (e.g., using the PRID associated with the forwarded I/O request 116A), and write the accessed data into the cache 141 at the cache storage location 304 mapped to the VCID of the forwarded I/O request 116A. Servicing a write I/O request 116A may comprise writing data to the cache 141, as disclosed herein, and may further comprise writing data of the forwarded I/O request 116A to the corresponding storage resource in accordance with the persistence level and/or cache mode assigned to the I/O request 116A. In a write-through cache mode, the cache storage module 142 may write the data of the forwarded I/O request 116A to both the cache 141 and corresponding primary storage (e.g., storage resource). The cache storage module 142 may acknowledge completion of the forwarded I/O request 116A when the data is written-through to the primary storage resource 121. In a write-back cache mode, the cache storage module 142 may acknowledge completion after writing the data to the cache 141, and may mark the corresponding cache storage location 304 as "dirty" or "non-discardable" until the data is written back to the primary storage resource 121. In a write-never or write-vectored cache mode (ephemeral persistence level), the cache storage manager 132 may write the data to the cache 141 without writing the data to the primary storage resource 121 and/or without marking the data as "dirty" or "non-discardable," such that the data is not written through and/or back to the primary storage resource 121.

As disclosed above, the cache automation module 150 may be configured to automatically configure caching services in response to changes to the I/O topology within the system 100D. The cache automation module 150 may comprise a detector 152 that identifies changes to the I/O topology. The detector 152 may determine a change to the I/O topology by use of an interface 111 of the virtualization infrastructure 110, by monitoring I/O requests 115X in the I/O stack 107X, and/or the like. As disclosed above, a modification to the I/O topology may correspond to deployment of a VM 114A-N within the virtualization environment 112, deployment of a storage resource (e.g., deployment of a VM 114A-N, a storage service 120 by a VM 114A-N), and/or the like.

In response to detecting a storage resource, such as, or pertaining to, the VM 114A (e.g., a storage service 120 utilized and/or referenced by the VM 114A), the cache automation module 150 may: a) determine whether to enable caching services for the detected storage resource (based on the automation policy 154, as disclosed herein), and b) automatically configure caching services for the detected storage resource by use of the configuration engine 154. The configuration engine 154 may configure caching services for a storage resource pertaining to the VM 114A (e.g., virtual volume 125A) by: a) configuring the provisioner 144 to allocate cache storage resources to the VM 114A (if needed), and b) configuring the cache manager 132A to identify and service I/O requests 116 pertaining to the detected storage resource. The configuration engine 154 may determine whether to provision cache resources to the VM 114A based on whether the provisioner 144 has already provisioned cache resources to the VM 114A. For example, the detector 152 may have detected the storage resource in response to deployment of the VM 114A on the computing device 101 (e.g., in response to the VM 114A being created, initialized, resumed, powered-on, and/or transferred to the computing device 101). Accordingly, the provision 144 may not have yet allocated cache resources to the VM 114A. In response, the configuration engine 154 may instruct the provisioner 144 to allocate cache resources to the VM 114A in accordance with the automation policy 154, cache resource availability, and/or the like, as disclosed herein. In another embodiment, the VM 114A may have been already deployed on the computing device 101 and the detector 152 may have detected the storage resource in response to the VM 114A creating, initializing, and/or defining a new virtual storage volume. In this embodiment, the provisioner 144 may have already allocated cache resources for other storage resources associated with the VM 114A and, as such, may not allocate additional resources to the VM 114A. In some embodiments, the cache automation policy 154 may specify allocation of additional cache resources to the VM 114A regardless of whether cache resources have been provisioned to the VM 114A. The automation policy 154 may, for example, specify a particular QoS for the detected storage resource and/or the VM 114A, which, inter alia, may require additional storage capacity in the cache 141. Provisioning cache resources to the VM 114A may comprise: a) allocating unused or free storage resources in the cache 141 and/or b) reallocating cache resources provisioned to other VMs 114B-N to the VM 114A. Provisioning cache resources to the VM 114A may further comprise informing the cache manager 132A of the VM 114A of the cache resources allocated thereto (e.g., through the communication link 128, as disclosed herein). The provisioner 144 may, for example, be configured to provide the cache manager 132A with the number of VCIDs allocated to the VM 114A-N and/or may provide a specific set, group, range, and/or extent of VCIDs provisioned for the VM 114A. The cache manager 132A may maintain a set 135A of data tags 138 corresponding to the provisioned cache resources, as disclosed herein.

Configuring caching services for the VM 114A may further comprise configuring the monitor 134A of the cache manager 132A to identify I/O requests 116 pertaining to the detected storage resource. The configuration engine 154 may be configured to issue a configuration message and/or configuration information to the cache manager 132A through, inter alia, the communication link 128. In response, the cache manager 132A may configure the monitor 134 to identify and redirect I/O requests 116 associated with the detected storage resource within the I/O stack 107A of the VM 114A. The cache manager 132A may configure an existing, deployed monitor 134A to identify the I/O requests 116A. Alternatively, or in addition, the cache manager 132A may deploy and/or initialize a new monitor 134 in the I/O stack 107A to identify the I/O requests 116A.

In some embodiments, configuring caching services for the VM 114A further comprises transmitting policy information to the cache manager 132A (through the communication link 128). The cache manager 132A may use the policy information to define, inter alia, the cache policy 402A implemented for the detected storage resource. The cache policy 402A may determine a persistence level and/or cache mode for I/O requests 116A pertaining to the detected storage resource, define file-sharing parameters, and/or the like as disclosed herein. The policy information may, for example, specify a write-through cache mode for I/O requests 116A serviced by the cache manager 132A and/or the cache service module 140. In another embodiment, the policy information may indicate that the detected storage resource comprises files suitable for admission into a file-sharing cache and/or may provide file-selection criterion for identifying such files. In another embodiment, the policy information may indicate that certain files on the detected storage resource are ephemeral and, as such, should be serviced using an ephemeral persistence level (e.g., write-never, write-vectored cache mode).

The cache automation module 150 may be further configured to detect storage resources pertaining to VMs 114B-N serviced by the cache manager 132X, such as virtual volume 125B of VM 114B. In response, the configuration automation module 150 may determine whether to cache data pertaining to the virtual volume 125B by use of the cache automation policy 156, as disclosed herein. The configuration engine 154 may configure caching services for the virtual volume 125B by, inter alia, a) providing for allocating cache resources to the VM 114B by use of the provisioner 144 and/or b) configuring the monitor 134X to identify I/O requests 116X pertaining to the virtual volume 125B in the I/O stack 107X and to forward the I/O requests 116X to the cache manager 132X, as disclosed herein. The configuration engine 154 may be further configured to provide cache policy information to the cache manager 132X which may be used to determine a cache policy 402X for I/O requests 116X corresponding to the virtual volume 125B, as disclosed above.

As disclosed herein, the cache automation policy 154 may be configured to determine whether to cache data of a detected storage resource based on a number of factors, including, but not limited to: storage resource type (e.g., clustered, shared, etc.), characteristics and/or properties of the VM 114A-N associated with the detected storage resource, characteristics and/or properties of application(s) configured to access the detected storage resource, characteristics and/or properties of object(s) (e.g., files) stored on the detected storage resource, QoS requirements of VMs 114A-N deployed within the virtualization environment, load, resource availability, and so on. In the FIG. 1D embodiment, the VM 114B may comprise a virtual volume 125X that is shared with another VM deployed on another computing device (e.g., a cluster shared volume). The VM 114B may create and/or initialize the virtual volume 125X, and associate the virtual volume 125X with storage volume 124X. The storage volume 124X may be shared with other VMs deployed within other computing device (s) and through different respective virtual volumes (not shown). In response to detecting the virtual volume 125X on the VM 114B, the cache automation module 150 may determine whether to enable caching services for the virtual volume 125X by use of the cache automation policy 156. The cache automation module 150 may determine that caching services should not be enabled for the virtual volume 125X based on the volume type (clustered shared); caching data pertaining to the virtual volume 125X on the computing device 101 could create data consistency issues for VMs attempting to access the corresponding volume 124X from computing device(s). As such, the cache automation module 150 may configure the monitor 134X to ignore I/O requests 115X pertaining to the virtual volume 125X in the I/O stack 107X.

Figure 5:
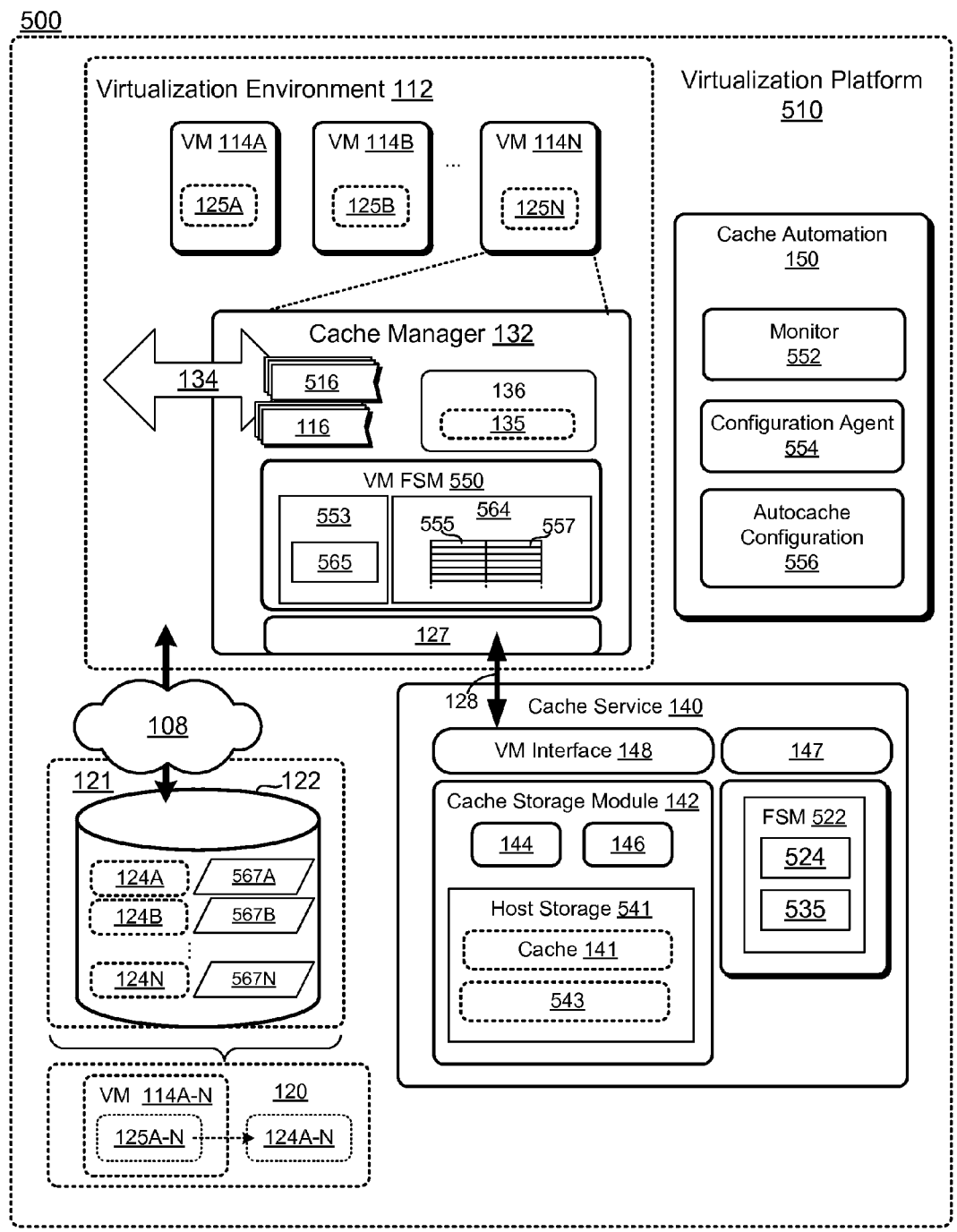
FIG. 5 is a block diagram depicting another embodiment of a system for automated cache configuration.

FIG. 5 is a block diagram that depicts another embodiment of a system 500 for automated I/O configuration. The cache service module 140 of the FIG. 5 embodiment may comprise a file-share module (FSM) 522. The FSM 522 may be configured to manage file data common to two or more of the VMs 114A-N, which may comprise, inter alia, providing access to file data stored in file-share store 543 to two or more of the VMs 114A-N operating within the virtualization environment 112. In the FIG. 5 embodiment, the virtualization environment 112 may be configured for operation on a computing device (not shown) and/or may be managed by a virtualization platform 510. The virtualization platform 510 may comprise a virtualization infrastructure (such as the virtualization infrastructure 110 disclosed herein), a virtualization clustering system, a virtualization center, and/or the like. The virtualization platform 510 may be configured to manage deployment of VMs 114A-N within a plurality of different virtualization environment(s) on a plurality of different host computing device(s).

In some embodiments, the VMs 114A-N may share common I/O characteristics, which may strain the I/O infrastructure of the system 500, the storage resources, and/or network 108. The VMs 114A-N may share similar data sets (e.g., operating systems, applications, user profile information, or the like), and may be configured to access this common data at similar times (e.g., during boot-up, power-on, log-in time, or the like). The resulting "boot storms" may overwhelm the system 500, which may significantly degrade overall performance. Similar file access storms may occur in response to the VMs 114A-N booting, initializing, loading particular applications, accessing shared data, accessing user profile information, executing login processes, and so on. Moreover, the cache service module 140 may be configured to provide caching services to the VMs 114A-N, which may result in admitting similar, duplicated data sets into the cache 141.

One or more of the VMs 114A-N may comprise a respective cache manager 132 configured for operation within the respective guest operating system(s) of the VM 114A-N (as disclosed above in conjunction with FIG. 1D). The cache manager 132 may be configured to identify I/O requests 116 pertaining to storage resource(s) enabled for caching services (by the cache automation module 150, as described herein), and may service the identified I/O requests 116 by use of the cache service module 140 (and cache 141). In the FIG. 5 embodiment, the cache 141 may be embodied as a partition and/or portion of the host storage 541 of the computing device 101 (not illustrated in FIG. 5 to avoid obscuring the details of the depicted embodiment). The host storage 541 may comprise volatile and/or non-volatile storage media, as disclosed herein. Although FIG. 5 depicts the cache manager 132 operating within a VM 114A-N, the disclosure is not limited in this regard and, in other embodiments, the system 500 may be adapted to deploy the cache manager 132 within the base operating environment 106 of the computing device 101, as disclosed herein.

The provisioner 144 may manage allocations of the host storage 541 and/or cache 141 to the VMs 114A-N, as disclosed herein. The translation module 146 may be configured to map VCIDs and/or other identifiers to respective storage locations in the host storage 541 (e.g., cache storage locations 304, as disclosed herein). The provisioner 144 may be further configured to allocate resources to the FSM 522 for use as, inter alia, file-share store 543. The translation module 146 may be configured to map virtual addresses (VCIDs) of the storage resources allocated to the file-share store 543 to respective cache storage locations 304, as disclosed herein.

As depicted in FIG. 5, the virtualization environment 112 may be configured to host a plurality of VMs 114A-N. The VMs 114A-N may comprise a respective cache manager 132 and/or VM file share module (VM FSM) 550. The VM FSM 550 may comprise and/or be communicatively coupled to a monitor 134 configured to monitor I/O requests within the respective VMs 114A-N (within the I/O stack of the respective VMs 114A-N, such as I/O stack 107A of FIG. 1D). The monitor 134 may comprise an I/O driver, filter driver, and/or the like, as disclosed herein. In some embodiments, the monitor 134 comprises a multi-level and/or file-level I/O monitor configured to monitor I/O requests at various layers of a VM I/O stack. The VM FMS 550 may be configured to maintain layer-specific metadata pertaining to I/O requests of the respective layer(s). Further embodiments of file-level and multi-level caching are disclosed in U.S. patent application Ser. No. 13/287,998 to Joshi Vikram et al., filed Nov. 2, 2011, entitled, "Systems and Methods for a File-Level Cache," which is hereby incorporated by reference in its entirety.

The VM FSM 550 may be configured to identify data suitable for admission into the file-share store 543 (managed by the FSM 522). Data suitable for admission into the file-share store 543 may include file data that is used within multiple VMs 114A-N and is "stable" (e.g., the data is rarely updated and/or modified). The VM FSM 550 may be configured to identify data suitable for admission by use of a file-share policy module 553. In some embodiments, the VM FSM 550 may operate at a file layer of the I/O stack of a VM 114A-N and, as such, may be configured to monitor I/O requests pertaining to file I/O operations of the VM 114A-N (by use of the monitor 134). Alternatively, or in addition, the VM FMS 550 may monitor I/O requests within other layers of the I/O stack, such as a volume layer, disk layer, SCSI layer, and/or the like.

The file-share policy module 553 may be configured to identify files suitable for admission into the file-share store 543 based on, inter alia, a file-share admission policy 565. The file-share admission policy 565 may include file selection criterion, which may include, but is not limited to: file-name matching, extension matching, volume matching, disk matching, inclusion lists, exclusion lists, and/or the like. The file selection criterion may comprise dynamic and/or learned criteria. For example, in some embodiments, the file-share policy module 553 may be configured to monitor file I/O access patterns within respective VMs 114A-N to dynamically identify files suitable for admission into the file-share store 543. For example, the file-share policy module 553 may be configured to monitor file access frequencies for one or more of write operations and read operations. Files subject to multiple read operations (and few, if any, write operations) may be selected for admission into the file-share store 543. In some embodiments, the file-share policy module 553 may select files for admission in response to properties of the I/O request 516, API calls, and/or other messages. An I/O request issued within the VM 11A may, for example, include flags and/or other metadata indicating that the corresponding data should be admitted into the file-share store 543. Alternatively, or in addition, the VM FSM 550 may be configured to receive admission configuration and/or hints through a configuration interface (e.g., interface module 147, disclosed herein). The interface module 147 may be configured to receive file-share admission policy information through one or more of: dedicated APIs, block device interface calls, I/O requests, fadvise calls, IOCTL calls, fallocate calls, parameters, flags, and the like. As disclosed in further detail herein, the file-share admission policy 565 of the VM FSM 550 may be set by, inter alia, the cache automation module 150.

The file-share policy module 553 may be configured to prevent data from being redundantly cached in multiple cache layers, which may comprise preventing data that has been admitted into the file-share store 543 from being admitted into the cache 141. The VM FSM 550 may inform the cache manager 132 of the PRID corresponding to file data admitted into the file-share store 543 and, in response the cache manager 132, may exclude (and/or evict) the corresponding data from the cache 141 (by use of data tags 135).

FIG. 6 depicts one embodiment of a file-share admission policy 565 comprising file selection criteria. The file-share admission policy 565 may comprise pattern matching and/or wildcard criteria. As illustrated in FIG. 6, files having a ".sys" extension are identified as suitable for admission into the file-share store 543, and files having a ".dat" extension should be excluded. The file-share admission policy 565 may identify suitable files based upon a volume and/or portions of a qualified file name. As illustrated in FIG. 6, files in a "windows\system32" or "\windows\system" path are suitable for de-duplication, whereas files in the "working_files" directory are excluded. The file-share admission policy 565 may identify specific files (e.g., corporate_template.doc), file patterns, volumes, drives, and/or the like. In some embodiments, the file-share admission policy 565 may identify files suitable for admission into the file-share store 543 based on application-level knowledge (e.g., based on the application and/or storage client 503 associated with an I/O request). In one embodiment, certain applications may access file data in a read-only mode. The file-share admission policy 565 may indicate that files accessed by such applications are suitable for admission into the file-share store 543 (e.g., files accessed by "Application X" are admittable). The file-share admission policy 565 may be further configured to specify files for admission into (or exclusion from) the file-share store 543 by use of file attributes. As illustrated in FIG. 6, files comprising a particular attribute value "X" may be suitable for admission (e.g., a read-only flag). Although particular examples of file-share admission policy 565 are illustrated herein, the disclosure is not limited in this regard and could incorporate any suitable file selection criteria, including, but not limited to: pattern matching, regular expressions, expert systems, I/O access modes, fadvise information, fallocate information, I/O control (IOCTL) information, and so on.

Referring back to FIG. 5, the VM FSM 550 may be configured to a) monitor VM I/O requests (by use of the monitor 134) and b) identify I/O requests 516 pertaining to files that are suitable for the file-share store 543 using, inter alia, the file-share policy module 553. The VM FSM 550 may be further configured to service the identified I/O requests 516 by use of the FSM 522. In some embodiments, the VM FSM 550 is configured to redirect the identified I/O requests 516 to the FSM 522 by use of a virtual storage service 127 deployed within the VM 114A-N (e.g., a VLUN disk presented in the VM 114A-N by use of a VLUN driver of the VM interface 148). Alternatively, or in addition, the VM FSM 550 may be configured to tag the identified I/O requests 516 to enable the I/O requests 516 to be identified in the I/O stack of the computing device 101 (e.g., the I/O stack 107, as disclosed herein). The VM FSM 550 may be configured to provide additional metadata pertaining to the I/O requests 516 forwarded to the FMS 522. In some embodiments, the VM FSM 550 includes a data identifier (DID) 557 with the identified I/O requests 516, which may enable the FSM 522 to a) determine whether the corresponding file data exists in the file-share store 543 and/or b) access a file-share tag 535 corresponding to the file data, and so on.

The VM FSM 550 may be configured to maintain file-share metadata pertaining to data that has been admitted into the file-share store 543. The metadata may include a file-share dictionary 564. The file-share dictionary 564 may comprise an index that associates unique file identifiers (UFIDs) 555 of the particular VM 114A-N with context-free DIDs 557. A UFID 555 may uniquely identify a file with respect to the particular VM 114A-N (e.g., uniquely identify the file within the namespace of the file system and/or operating system of VM 114A-N). The UFID 555 of a file may comprise a combination of the name of the file and a volume identifier (VID), which may comprise a volume GUID, volume name, or the like (e.g., "\\VID:\windows\system32\kernel32.dll"). Files may be further identified by use of a context-independent identifier. As used herein, a context-independent or context-free identifier refers to an identifier that is independent of the namespace of the particular VM 114A-N. The context-independent and/or context-free identifier may be used to allow different VMs 114A-N to share access to data in the file-share store 543. In some embodiments, the context-independent identifier comprises a DID 557, which may be derived from the contents of the file (e.g., file data). The DID 557 may include, but is not limited to: a hash value (e.g., SHA-1, MD5, or the like), a checksum, a Cyclic Redundancy Check (CRC) value, a CRC32, a signature, or the like. Accordingly, a context-independent identifier and/or DID may comprise and/or be referred to as a file signature. Generating the DID 557 of file data may comprise reading at least a portion of the file data (e.g., contents of the file) and using the file data to generate the DID 557 (e.g., by hashing the file data, signing the file data, processing the file data, or the like). The DID 557 of a file may be common to the VMs 114A-N and/or file-share store 543. Accordingly, the DID 557 of a file may comprise a context-free and/or universal identifier of the file, which may be used to reference the file data by the FSM 522 and/or any VM 114A-N of any host computing device 101.

The FSM 522 may be configured to admit file data into the file-share store 543 in response to admission request(s) from the VMs 114A-N. The FSM 522 may be configured to index file data by use of a set of file-share tags 535 (or file catalog). As disclosed in further detail herein, the file-share tags 535 may be configured to map and/or index file data stored in the file-share store 543 thereto by use of context-independent identifiers, such as DIDs 557, which may allow different VMs 114A-N, having different file naming conventions and/or file paths, to access file data within the file-share store 543. For example, the UFID of "kernel32.dll" on the VM 114A may be referenced by "\\VID_1\windows\system32\kernel32.dll," which may differ from the UFID on another VM 114B-N (e.g., the UFID of "kernel32.dll" on VN 114B may be "\\VID_2:\windows_install\system32\kernell32.dll"). However, since the DIDs 557 are derived from the file data, as opposed to file name and/or path information, the DIDs 557 used by the VMs 114A-N that reference "kernel32.dll" may be the same.

As disclosed above, the file-share dictionary 564 maintained within the respective VMs 114A-N by respective VM FSMs 550, may be configured to associate the UFID 555 of files that have been admitted into the file-share store 543 with respective DIDs 557. The file-share dictionary 564 may be implemented using any suitable data structure, including, but not limited to: a tree, hash table, linked list, lookup table, content addressable map (CAM), or the like. FIG. 7 depicts one embodiment of a file-share dictionary 564. The file-share dictionary 564 of FIG. 7 associates virtual-machine-specific UFIDs 555 with corresponding context-independent DIDs 557 (represented in Hex format). As disclosed above, the UFIDs 555 may correspond to a UFID of a particular VM 114A-N (e.g., a fully qualified file name), and the DIDs 557 may comprise a context-independent identifier of the files, which may be derived from the contents of the file. The VM FSM 550 may be configured to identify files that have been admitted into the file-share store 543 by use of the UFIDs 555 and to reference the data by use of the corresponding context-independent DIDs 557.

Referring back to FIG. 5, the FSM 522 may manage the contents of the file-share store 543 by admitting file data of the VMs 114A-N into the file-share store 543 and providing access to the stored file data to two or more of the VMs 114A-N. The provisioner 144 may allocate storage capacity (e.g., chunks 302) to the FSM 522 for use in storing file data of the VMs 114A-N. The FSM 522 may manage the storage capacity allocated thereto using, inter alia, data tags 138, as disclosed above (e.g., illustrated as a set of file-share tags 535 in FIG. 5). The FSM 522 may use the set of file-share tags 535 to map context-independent identifier(s) of file data admitted into the file-share store 543 (e.g., the DID 557 disclosed herein) to storage locations of the corresponding file data in the file-share store 543. The file-share tags 535 may correspond to the capacity allocated to the FSM 522 by the provisioner 144 (e.g., each file-share tag 535 may correspond to a respective cache storage location 304). The FSM 522 may dynamically add and/or remove file-share tags 535 in response to allocation operations of the provisioner 144, as disclosed herein. The file-share tags 535 may be maintained in any suitable data structure, including, but not limited to, contiguous memory, a table, a tree, or the like. FIG. 8 depicts one embodiment of a set of file-share tags 535. As illustrated in FIG. 8, the file-share tags 535 may be configured to associate DIDs 557 of files and/or file data admitted into the file-share store 543 with respective storage locations 857 of the file data within the host storage resource 541 (e.g., file-share store 543). The storage locations 857 may comprise references to virtual addresses that are translated to physical addresses by the translation module 146, as disclosed herein. Alternatively, the storage locations 857 may comprise physical cache addresses that directly reference data stored in the file-share store 543. Like the data tags 138 disclosed herein, the file-share tags 535 may comprise additional metadata (not shown), such as access metrics, timer data, and so on, which may be used to manage admission to and/or eviction from the file-share store 543. The file-share tags 535 may further comprise identifiers of VMs 114A-N (VMIDs) 859 associated with the file data that has been admitted into the file-share store 543. As disclosed in further detail herein, the VMIDs 859 may be used to secure data admitted into the file-share store 543 and/or prevent read-before-write hazards.

Referring back to FIG. 5, as disclosed herein, the VM FSM 550 may be configured to a) identify I/O requests 516 pertaining to files suitable for admission into the file-share store 543, and b) determine whether data of the I/O requests 516 has been admitted into the file-share store 543. The VM FSM 550 may determine whether data of an identified I/O request 516 has been admitted into the file-share store 543 by use of the file-share dictionary 564. If the file-share dictionary 564 comprises a valid entry corresponding to the UFID 555 of a file corresponding to the I/O request 516, the VM FSM 550 may attempt to service the request using the file-share store 543, which may comprise requesting the data from the file-share store 543 using the corresponding DID 557 in the file-share dictionary 564. Referring to FIG. 7, the VM FSM 550 may request file data of "VID\windows\system32\kernel32.dll" from the FSM 522 using the corresponding DID 557 "EA733BA0."

The FSM 522 may receive I/O requests 516 pertaining to file data in the file-share store 543 from the VMs 114A-N. The I/O requests 516 may be received directly through the virtual storage service 127 (e.g., issued through the corresponding VLUN disk within the respective VM 114A-N) and/or by monitoring the I/O stack, as disclosed herein. The I/O requests 516 may include and/or reference a DID 557 (the DID 557 may be determined by the VM FSM 550 of the corresponding VM 114A-N). In response to an I/O request 516, the FSM 522 may determine whether data corresponding to the request is available in the file-share store 543 by use of the file-share tags 535. The FSM 522 may attempt to reference a file-share tag 535 that corresponds to the DID 557 of the I/O request 516. If a valid file-share tag 535 exists, the FSM 522 may access the corresponding file data in the file-share store 543 and provide the data to the VM FSM 550 in response to the I/O request 516. If the file-share store 543 does not have the requested data (e.g., a valid file-share tag 535 corresponding to the DID 557 does not exist), the FSM 522 may signal a "miss" indication (or other error code). In response, the VM FSM 550 may attempt to admit the file data into the file-share store 543. Admitting the data may comprise reading data of the file from primary storage resource 160 (or another storage resource), determining a DID 557 of the file data, and issuing a request to admit the file data to the file-share store 543 (e.g., by issuing a file data admission I/O request 516 to the FSM 522). The admission request may include the file data and the corresponding DID 557. The VM FSM 550 may be configured to generate the admission request in a separate thread and/or process that is outside of the critical path of the original I/O request 516. As used herein, the critical path of an I/O request 516 refers to the sequence of operations that contribute to the latency of the I/O request 516. Since admitting the data into the file-share store 543 is performed in a separate thread and/or process, the I/O request 516 can be serviced normally and may not significantly impact the performance of the original I/O request 516.

In some embodiments, the VM FSM 550 may be configured to admit portions of a file into the file-share store 543. A file-share policy module 524 may determine the maximum size for files admitted into the file-share store 543. The VM FSM 550 may determine whether the file exceeds the maximum file size and, if so, may attempt to admit only a portion and/or chunk of the file. For example, a large file "large.dll" may be segmented into 16 chunks, which may be identified by a relative index: "large1.dll," "large2.dll," and so on. The file-share tags 535 may comprise separate entries (and corresponding DIDs 557) for each segment of the file. The VM FSM 550 may attempt to admit the various portions of the file as needed (e.g., in response to I/O requests 516 pertaining to various portions of the file). The file-share policy module 524 may be configured to selectively admit file data into the file-share store 543 in response to requests from the VMs 114A-N. The file-share policy module 524 may determine whether to admit data into the file-share store 543 based on various factors, which may include, but are not limited to: resource availability, access metrics (e.g., how many different VMs 114A-N have requested the file data and/or access metrics of the requests), and so on.

In response to determining to admit data, the FSM 522 may be configured to: allocate one or more file-share tag(s) 535 for the request; associate the allocated file-share tags 535 with the DID(s) 557 of the request; and provide for storing the file data in the file-share store 543 (in association with the virtual addresses of the corresponding file-share tags 535). Admitting the data may further comprise providing an indication to the VM FSM 550 that the data was successfully admitted into the file-share store 543. In response to the indication, the VM FSM 550 may update the VM file-share dictionary 564, which may comprise adding an entry to associate the UFID 555 of the file with the corresponding DID 557. The VM FSM 550 may be further configured to indicate that the file is being managed by the FSM 522 in the file-share store 543 so that other I/O services and/or cache layers do not redundantly cache data of the file.

If the admission request is not satisfied, due to cache policy or an error condition, the FSM 522 may return an error code (or other indication) to the VM FSM 550. In response, the VM FSM 550 may remove entries corresponding to the DID(s) 557 of the admission request from the file-share dictionary 564 (if any) and/or indicate to other I/O services and/or cache layers that the file has not been admitted into the file-share store 543.

As disclosed herein, each VM 114A-N may reference file data using the same, context-free DID 557 values. Referring to FIG. 8, each VM 114A-N may reference the file data of "kernel32.dll" using the same DID 557 "EA733BA0." Accordingly, each VM 114A-N that accesses "kernel32.dll," and determines that "kernel32.dll" is suitable for admission into the file-share store 543, will attempt to admit the file using the same DID 557 "EA733BA0." When each VM 114A-N attempts to access "kernel32.dll" for the first time, the VM file-share dictionary 564 of the respective VM 114A-N will not include an entry for the file. Therefore, the VM FSM 550 will attempt to admit the file into the file-share store 543, which, as disclosed above, may comprise reading the file "kernel32.dll," calculating the DID 557 ("EA733BA0"), and issuing a request to admit the file data to the file-share store 543. Accordingly, the file-share store 543 may receive many different requests to admit the same data (e.g., data associated with the same DID 557).

In response to a request to admit file data corresponding to a particular DID 557, the FSM 522 may determine whether data corresponding to the DID 557 has already been admitted (by a different VM 114A-N) by, inter alia, reference to the file-share tags 535. If a valid file-share tag 535 associated with the DID 557 already exists, the FSM 522 may determine that the file data of the admission request has already been admitted. The FSM 522 may acknowledge the admission request without re-admitting the file data. The FSM 522 may, however, update the file-share tag(s) 535 to indicate that the corresponding VM 114A-N is authorized to read the file data from the file-share store 543 (e.g., update the VMID 859 of the file-share tag(s) 535).

In some embodiments, VM FSM 550 is configured to verify that the existing file data in the file-share store 543 matches the file data in the admission request. This verification may be used to prevent errors due to DID collisions. As used herein, a DID collision refers to a situation in which different file data results in the same DIDs 557. DID collisions may result from using shorter, less complex DIDs 557. The size and/or complexity of the DIDs 557 may be a tradeoff between a) the overhead needed to calculate, communicate, and/or store the DIDs 557 and b) the probability of DID collisions. Although large, complex DIDs 557 may significantly reduce the likelihood of DID collisions, the overhead of such DIDs 557 may be undesirable. In some embodiments, the size and/or complexity of the DIDs 557 may be based on, inter alia, the number of unique files (and/or file versions) that may be admitted into the file-share store 543. Embodiments that require fewer unique files and/or file versions may be configured to use less complex and/or smaller DIDs 557. Embodiments that require a relatively large number of unique files and/or file versions may be configured to use large, more complex DIDs 557. The size of the DIDs 557 and/or other configuration information may be managed by use of the configuration interface 147, as disclosed herein.

In some embodiments, the FSM 522 may be configured to verify that matches between two or more DIDs 557 are not due to a DID collision. Verifying DIDs 557 may comprise comparing the file data from which the DIDs 557 were determined (e.g., performing a byte-by-byte comparison). Accordingly, in response to determining that the DID 557 of an admission request matches the DID 557 associated with a valid de-duplication file-share tag 535, the FSM 522 may be configured to verify that the underlying file data matches by, inter alia, comparing the data in the admission request to the data in the file-share store 543; comparing stronger hash, signature, and/or CRC values; or the like. If the match is due to a collision, the file-share store 543 may be configured to return an error to the VM FSM 550 indicating that the admission request could not be satisfied. Alternatively, the file-share store 543 may be configured to admit the data using an alternative DID 557, and may provide the alternative DID 557 to the VM FSM 550 in response to successfully writing the data into the file-share store 543. The alternative DID 557 may be generated in a deterministic manner, such that subsequent requests (from VM FSM 550 of other VMs 114A-N) will also result in the same alternative DID 557. The alternative DID 557 may be derived from the original DID 557 and/or may be derived from the file data itself. For example, the alternative DID 557 may be calculated using an alternative hash, signature, or other algorithm. Alternatively, or in addition, the alternative DID 557 may comprise a two-part identifier, comprising a first portion derived from the original DID 557 and a second portion generated by the file-share store 543 and/or VM FSM 550.

As disclosed above, in response to receiving an acknowledgement that the admission request was satisfied, the VM FSM 550 may update the VM file-share dictionary 564 to associate the file UFID 555 with the corresponding DID 557 (or alternative DID 557). The VM FSM 550 may service subsequent I/O requests pertaining to the file by use of the file-share store 543, which may comprise: a) identifying I/O requests 516 pertaining to the file, b) determining that the file has been admitted into the file-share store 543 in reference to the VM file-share dictionary 564 (e.g., matching the UFID 555 of the file to a valid entry in the file-share dictionary 564), c) requesting data to satisfy the I/O request 516 from the file-share store 543, and d) satisfying the I/O request 516 using data provided by the file-share store 543. The VM FSM 550 may, therefore, redirect I/O requests 516 directed to the primary storage resource 160 to the FSM 522, which may remove the load and/or I/O overhead from the primary storage resource 160, network 108, and/or the like.

In some embodiments, VM FSM 550 is configured to store the file-share dictionary 564 (e.g., a snapshot 567A) on a persistent storage medium, such as the primary storage resource 160 and/or the like. As disclosed above, a snapshot refers to current-state information regarding the data that has been admitted into the file-share store 543 by the particular VM 114A-N. Accordingly, storing a snapshot 567A of the VM FSM 550 may comprise storing the entries comprising file-share dictionary 564 of the VM 114A, such as the UFIDs 555 and DIDs 557 of the data that has been admitted into the file-share store 543 by the VM 114A. Other VMs 114B-N may be configured to store respective snapshots 567B-N. The snapshots 567A-N may be persisted in any suitable format, including, but not limited to: a file, a configuration repository such as a registry or persistent settings, a database, cache storage, or the like.

In some embodiments, the VM FSM 550 is configured to load a corresponding snapshot 567A-N after the corresponding VM 114A-N undergoes a reboot, restart, power-cycle, and/or host transfer operation. Loading the snapshot 567A-N may comprise populating the file-share dictionary 564 of the VM 114A-N with the UFIDs 555 and corresponding DIDs 557 of the files that have been admitted into the file-share store 543 by the respective VM 114A-N. Therefore, when the VM 114A-N restarts, the VM FSM 550 may access data of files admitted into the file-share store 543 rather than accessing the primary storage resource 160, which may reduce the effects of the "boot storm" caused by multiple VMs 114A-N attempting to simultaneously access file data.

As disclosed above, the contents of the file-share store 543 may be shared between multiple VMs 114A-N. As such, the file-share store 543 and/or VM FSM 550 may be configured to manage modifications to files admitted to the file-share store 543, since such modifications could adversely affect other VMs 114A-N that are accessing the files. Accordingly, in some embodiments, the file-share store 543 may be configured to operate in a "read-only" mode, such that data cannot be modified after admission.

In some embodiments, VM FSM 550 is configured to monitor I/O requests within the VM I/O stack to identify requests to modify files that have been admitted into the file-share store 543. In response to identifying such a request, the VM FSM 550 may be configured to invalidate the file-share dictionary entry (or entries) corresponding to the file in the file-share dictionary 564. The VM FSM 550 may be further configured to update the corresponding snapshot 567A-N. Accordingly, subsequent I/O requests pertaining to the file may operate against the primary storage resource 160. The VM FSM 550 may be further configured to inform the FSM 522 that the file is no longer in use by the VM 114A-N. In response, the FSM 522 may remove the VMID of the VM 114A-N from the corresponding file-share tags 535 (remove the VMID 859 of the entry corresponding to the file).

As disclosed above, the provisioner 144 may be configured to dynamically allocate storage resources to the FSM 522 in response to, inter alia, the I/O requirements of the VMs 114A-N. The FSM 522 may be configured to manage the contents of the file-share store 543 in response to the resources allocated thereto. Managing the file-share store 543 may include, but is not limited to: a) selectively admitting (and/or denying admission) to the file-share store 543, b) maintaining access metrics, such as least recently used (LRU), steal timer, or the like, and/or c) removing file data from the file-share store 543. The FSM 522 may remove file data in response to capacity constraints, aging, resource allocation changes, or the like. Alternatively, or in addition, file data may be removed in response to a request from an external entity (via the configuration interface 540 and/or file-share policy module 524). For example, file data in the file-share store 543 may be corrupt or comprise a virus, Trojan, or the like. In response to detecting a problem with file data, the FSM 522 (or other entity) may remove the data. Removing the data may include, but is not limited to: invalidating and/or erasing the data from the host storage resource 136, removing file-share tags 535 corresponding to the data, and so on. Subsequent requests for the data may, therefore, result in a cache miss, which may result in readmission of the data into the file-share store 543, as disclosed herein.

In some embodiments, the FSM 522 is configured to secure data stored therein. Securing the data may comprise preventing read-before-write hazards. As used herein, a read-before-write hazard refers to an attempt by an entity to read data that was not written thereby (and/or data that the entity is not authorized to access). In the FIG. 8 embodiment, a read-before-write hazard may comprise a VM 114B attempting to read a file that was admitted into the file-share store 543 by VM 114A. As disclosed above, the file-share tags 535 may comprise an access list configured to identify the VMs 114A-N that are authorized to access particular files. Referring to FIG. 8, the VMIDs 859 of the de-duplication file-share tags 535 may identify the VMs 114A-N that are authorized to access particular file data. The FSM 522 may determine that a VM 114A-N is authorized to access a file in response to determining that the VM 114A-N has access to the underlying file data (e.g., access to the file on the primary storage resource 160). The FSM 522 may, therefore, determine that a VM 114A-N is authorized to access a particular file in response to the VM 114A-N admitting (and/or attempting to admit) the file into the file-share store 543, as disclosed herein. Referring to FIG. 8, the FSM 522 may restrict access to file "45AD342E" to VM 114B; VM 114A and VMs 114C-N may be prevented from accessing this data until they attempt to admit data having DID "45AD342E" into the file-share store 543.

In some embodiments, the read-before-write security restrictions may be lifted or relaxed. For example, when admitting file data into the cache, a VM 114A-N may indicate that the file data is "public" and may be accessed without restriction. For example, system files, such as "kernel32.dll" may be specified as "public." Public access may be denoted with a wildcard indicator in the access list, or the like (e.g., data of DID "20AE45EA" may be publicly accessible). Allowing unrestricted access to file data may be advantageous in certain situations. For example, and as disclosed above, after being transferred to another host, the VM 114A-N may load a snapshot 567A-N of the file-share dictionary 564. However, the VM 114A-N may not have attempted to admit the referenced files on the destination host and, as such, may not appear on the access list(s) maintained by the FSM 550 of the destination host, meaning that the VM 114A-N would have to attempt to re-admit the file(s) at the destination host before having access to the file(s). If the files are marked as publicly accessible, the VM 114A-N may immediately access the files at the destination host without further accesses to the primary storage resource 160, which, as disclosed above, may ameliorate boot storm issues when the VM 114A-N reboots, restarts, and/or is power-cycled as part of the transfer. Alternatively, or in addition, when a VM 114A-N is migrated to another host, the previous host may provide file-share metadata pertaining to the VM 114A-N to the destination host. The destination host may use the metadata to authorize the VM 114A-N to access data in the file-share store 543 of the destination host.

The file-share metadata may include the DIDs 557 of file data the VM 114A-N is authorized to access (e.g., the file-share tags 535 pertaining to the particular VM 114A-N). Further embodiments of systems and methods for file sharing are disclosed in U.S. patent application Ser. No. 13/750,904, entitled "Systems and Methods for a De-Duplication Cache," filed Jan. 25, 2013 for Vikram Joshi et al., which is hereby incorporated by reference in its entirety.

As disclosed above, the cache automation module 150 may be configured to configure caching services in response to changes to the I/O topology of the system 500, including deployment of VMs 114A-N, deployment of virtual disks and/or volumes 125A-N, and the like, which may result in deployment of a storage resource in the system 500 (e.g., a storage service 120 utilized and/or referenced by the VM 114A-N). The cache automation module 150 may comprise a monitor 552 configured to identify such changes by use of the virtualization platform 510 and/or by monitoring I/O requests in the system 500, as disclosed herein. The autocache configuration 556 may comprise configuration and/or policy information used to determine whether an identified storage resource is to be cached. The configuration agent 554 may automatically configure caching services for the identified storage resource by use of an interface module 147 of the cache manager 132 (and/or cache service 140), as disclosed herein (e.g., through the link 124). The autocache configuration 556 may comprise and/or reference file-sharing policy information, such as a file-share admission policy 565 and/or file-share policy for implementation by the file-share policy module 524.

The autocache configuration 556 may further comprise configuration and/or policy information used to determine whether to enable file sharing services for the identified storage resource. The configuration agent 554 may be adapted to automatically configure file sharing services by: a) configuring a VM FSM 550 of the corresponding VM 114A-N and/or b) configuring the FSM 522. Configuring the VM FSM 550 may comprise a) configuring a file-share admission policy 565 of the VM FSM 550, b) configuring the monitor 134 to identify I/O requests 516 that pertain to files suitable for admission into the file share cache 141, an/or c) configuring and/or initializing the file-share dictionary 564 of the VM FSM 550. The configuration agent 554 may, for example, populate a file-sharing policy 565 of the VM FSM 550 with file selection criteria defined in, inter alia, the autocache configuration 556. Configuring the VM FSM 550 may further include configuring the VM FSM 550 to load and/or provision the file-share dictionary 564 from a snapshot 567A-N. The configuration agent 554 may be further adapted to configure the VM FSM 550 to identify I/O requests 516 that pertain to file-sharing data (based on the file-share policy 565), and to service the identified I/O requests 516 using the FSM 522, as disclosed herein.

Configuring the FSM 522 may comprise instructing the provisioner 144 to allocate storage resources for the file-share store 543 (if not already allocated) and/or instruct the FSM 522 to maintain file-share tags 535 in accordance with the resources provisioned to the FSM 552. The configuration agent 554 may also configure a policy of the file-share policy module 524 to provide file-sharing services in accordance with the autocache configuration 556. Accordingly, the configuration agent 554 may automatically configure both the VM FSM 550 and FSM 522 to provide file-sharing services to one or more VMs 114A-N.

Figure 9:
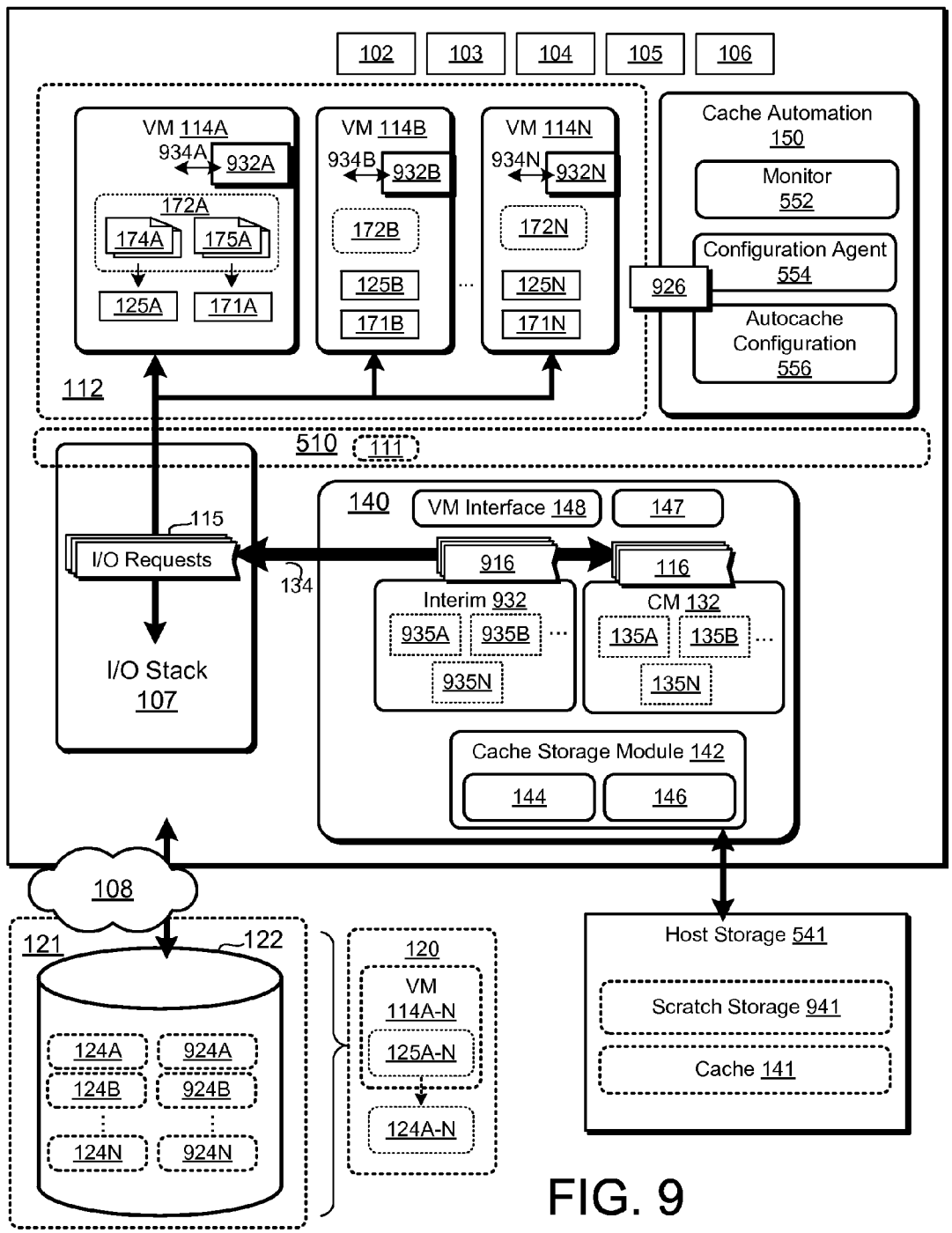
FIG. 9 is a block diagram depicting another embodiment of a system of automated I/O configuration, including write-vectoring.

FIG. 9 is a block diagram of another embodiment of a system 900 for automated I/O configuration. The computing device 101 may comprise host storage 541, which may comprise volatile and/or non-volatile storage resources of the computing device 101. The provisioner 144 may manage allocations of a portion of the host storage 541 as a cache 141. Alternatively, the cache 141 may be implemented on a separate host storage device (not shown). The provisioner 144 may also manage allocation of a portion of the host storage 541 for use as scratch storage 941.

In the FIG. 9 embodiment, the system 900 comprises a cache service module 140 that includes a cache manager 132 configured to provide cache services to VMs 114A-N deployed within the virtualization environment of the computing device 101. The cache manager 132 may be configured to maintain respective data tag sets 135A-N corresponding to cache resources provisioned to the VMs 114A-N by the provisioner 144, as disclosed herein. The cache service module 140 may be configured to service I/O requests in accordance with a particular persistent level (e.g., by write-vectoring I/O requests). As disclosed above, "write vectoring" refers to adapting I/O resources used to service I/O requests based on characteristics of the I/O requests (e.g., persistence requirements of the I/O requests). Write-vectoring may comprise storing data that does not need to be retained indefinitely in interim storage. Such data may include data that is to be retained while the corresponding storage client (e.g., VM) is running, but can be discarded after a particular time and/or in response to a particular condition and/or trigger (e.g., cycling the VM). Data that can be discarded after a particular time, in response to a particular condition or trigger is referred to herein as "ephemeral data," "temporary data," "transient data," "interim data," "write-vectored data," "disposable data," and/or the like. Ephemeral data may include, but is not limited to: swap files (e.g., virtual memory files, such as pagefile.sys and/or the like); temporary files, such as the contents of temporary directories (e.g., "/tmp" and/or the like); temporary application files (e.g., local cache of Microsoft Word® or the like); virtual memory management files; database cache files; I/O buffer files; and/or the like. By contrast, non-ephemeral, persistent, or long-term data refers to data that should be retained indefinitely and/or until the data is explicitly erased, deleted, deallocated, and/or the like. Accordingly, non-ephemeral data may be retained across VM cycles. As used herein, a "cycle" of a storage client (e.g., VM) refers to one or more of a reboot operation, restart, reset, power cycle, shutdown, crash, invalid shutdown, power loss, and/or the like. As used herein, write vectoring may comprise: a) identifying I/O requests pertaining to transient data, and b) servicing the identified I/O requests using designated storage resources that are separate from the primary storage resources to which the write requests are directed.

As disclosed in further detail herein, the cache automation module 150 may be configured to automatically configure write vectoring services of the system 900, which may comprise configuring components operating with the VMs 114A-N and/or the cache service module 140.

In the FIG. 9 embodiment, the VMs 114A-N may comprise respective virtual storage resources 125A-N (e.g., respective virtual disks, volumes, and/or the like), which may be associated with respective storage resources within the system 900, as disclosed herein. The VMs 114A-N may use the respective virtual storage resources 125A-N to perform I/O operations, which may include managing, reading, and/or writing files 172A-N. The virtual storage resources 125A-N may correspond to respective drives and/or volumes of a guest operating system and/or file system of the VMs 114A-N (e.g., the "c:\" drive of a Windows operating system, the root of a UNIX and/or Linux file system, and/or the like). The virtualization infrastructure 110 may service I/O requests directed to the virtual storage resources 125A-N by use of an I/O stack within the VM 114A-N (not illustrated in FIG. 9 to avoid obscuring the details of the disclosed embodiment) and/or an I/O stack 107 of the base operating environment 106. Accordingly, writing data to particular files 172A-N (e.g., non-ephemeral files 174A) may comprise writing the data to the corresponding primary storage resource 121 (volumes 124A-N, as disclosed herein). In addition, data pertaining to such I/O operations may be cached by use of the cache manager 132, as disclosed herein.

One or more of the VMs 114A-N are configured to identify I/O requests 916 that pertain to ephemeral data (e.g., data suitable for write vectoring). In some embodiments, one or more of the VMs 114A-N may comprise a write-vector module 932A-N, configured to identify and service I/O requests pertaining to ephemeral data (e.g., I/O requests 916). Alternatively, the VMs 114A-N may be configured to identify ephemeral I/O requests 916 by redirecting I/O requests to designated virtual storage resources 171A-N, as disclosed in further detail herein.

In embodiments comprising a write-vector module 932A-N deployed within one or more of the VMs 114A-N, the write-vector module 932A-N may comprise a respective monitor 934A-N that identifies ephemeral I/O requests 916 within an I/O stack of the VMs 114A-N. The monitor 934A-N may be configured to identify ephemeral data based on the characteristics of the I/O requests 916, such as a name, path, volume, and/or other identifier corresponding to the I/O request 916; properties and/or characteristics of the application and/or storage client associated with the I/O request 916 (e.g., application-level knowledge); inferences drawn from properties of the I/O requests 916; one or more parameters of the I/O request 916; parameters associated with the I/O request 916 (e.g., IOCTL information, fadvise, and/or the like); profiling metadata pertaining to the I/O requests 916; preferences and/or configuration; testing and experience; and/or the like. The monitor 934A-N and/or write-vector module 932A-N may, therefore, comprise a write-vector policy that includes criteria for identifying ephemeral I/O requests 916 within the I/O stack of the VMs 114A-N. The write-vector module 932A-N may be further configured to service ephemeral I/O requests 916 by a) forwarding the ephemeral I/O requests 916 to the interim storage module 922 (e.g., a communication link 128 and/or virtual storage resource 127, as disclosed above), by tagging the ephemeral I/O requests 916 to enable a monitor 134 of the cache service module 140 to identify the ephemeral I/O requests 916 within the I/O stack 107 of the base operating environment 106, and/or the like.

Although FIG. 9 depicts write-vector modules 932A-N deployed within the VMs 114A-N, the disclosure is not limited in this regard, and could be configured to identify ephemeral I/O requests 916 in other ways. In an alternative embodiment, also depicted in FIG. 9, the cache service module 140 may be configured to present and/or manage designated "write-vector" virtual storage resources (virtual disks 171A-N) within the VMs 114A-N. As disclosed in further detail herein, the VMs 114A-N may be configured to associate ephemeral data with the designated virtual disks 171A-N, and the cache service module 140 may identify ephemeral I/O requests 916 issued to the designated virtual disks 171A-N within the I/O stack 107. In such embodiments, the VMs 114A-N may not comprise respective write-vector module(s) 932A-N and/or monitors 934A-N. Similarly, in embodiments in which the VMs 114A-N are configured to identify ephemeral I/O requests 916 by use of respective write-vector modules 932A-N and/or monitors 934A-N, the cache service module 140 may not deploy and/or manage the designated virtual disks 171A-N within the VMs 114A-N.

The virtual storage resources 171A-N depicted in FIG. 9 may be designated for use with ephemeral data and, as such, may be referred to as "designated virtual storage resources" and/or "ephemeral storage resources" 171A-N. The VM interface 148 may present the designated virtual disks 171A-N within the VMs 114A-N by use of APIs, libraries, configuration, and/or settings of the virtualization infrastructure 112 and/or virtualization platform 510, as disclosed herein. The designated virtual disks 171A-N may be associated with a primary storage resource 121, such as a storage volume 924. In some embodiments, the storage volume 924 associated with the designated virtual disks 171A-N comprises a disposable storage volume 924 (e.g., a disposable disk) managed by the virtualization infrastructure 110 and/or virtualization platform 510. As used herein, a disposable storage volume refers to a storage volume that discards changes made during the runtime of a corresponding VM 114A-N.

The VMs 114A-N may comprise respective sets of files 172A-N, which may be managed by, inter alia, a guest operating system and/or file system of the VMs 114A-N. The files 172A-N may initially be associated with the virtual storage resource 125A-N (the "base" virtual storage resource 125A-N). As disclosed herein, certain files 172A-N may comprise ephemeral data that does not need to be retained between VM cycles (e.g., ephemeral files 175A). The VM 114A may associate ephemeral files 175A with the designated virtual disk 171A. Other, non-ephemeral files 174A may continue to be associated with the base virtual disk 125A. The VM 114A may issue I/O requests pertaining to the non-ephemeral files 174A to the base virtual storage resource 125A, and may issue I/O requests 916 pertaining to the ephemeral files 175A to the designated virtual disk 171A. In some embodiments, the system 900 comprises a redirection module 926 that redirects certain files 172A of the VM 114A (and/or files 172B-N of other VMs 114B-N) from an original, base virtual disk 125A to the designated virtual disk 171A. The redirection module 926 may, for example, replace a file path of one or more files to associate the one or more files, paths, directories, and/or volumes with the designated virtual disk 171A (e.g., redirect references to "c:\pagefile.sys" to "x:\pagefile.sys," redirect "c:\tmp" to "x:\tmp," and so on). The redirection module 926 may comprise a script configured to associate the ephemeral files 175A with the designated virtual disk 171A as part of a one-time initialization operation. Alternatively, or in addition, the redirection module 926 may modify file associations in real time (and/or on an as-needed basis) as new ephemeral files 175A are identified. In one embodiment, the redirection module 926 may designate new ephemeral files 175A in response to installing a new application and/or service on the VM 114A. For example, the redirection module 926 may associate one or more buffer files of a database application with the designated virtual disk 171A in response to installing and/or activating the database application on the VM 114A. The redirection module 926 may be implemented and/or managed by the configuration agent 554 of the cache automation module 150 to automatically configure write-vectoring for the VM 114A-N, as disclosed in further detail herein.

The monitor 134 of the cache service module 140 may be configured to identify I/O requests issued to the designated virtual disks 171A-N as ephemeral I/O requests 916, which may be serviced by use of the interim storage module 922 (and scratch storage 941), as disclosed herein. Requests issued to the base virtual disks 125A-N (and/or other virtual storage resources) may be serviced by use of the primary storage resources 121 associated with the virtual disks 125A-N (e.g., storage volumes 124A-N). Servicing an ephemeral I/O request 916 directed to a designated virtual disk 171A-N may comprise reading and/or writing data pertaining to the ephemeral I/O request 916 to the scratch storage 941 on the host storage resource 541 (e.g., according to the storage capacity allocated to the corresponding VM 114A-N) without accessing the primary storage resource(s) 121 associated with the designated virtual disk 171A-N. The interim storage module 922 may acknowledge completion of ephemeral I/O requests 916 in response to servicing the ephemeral I/O requests 916 using the host storage resource 541 and without accessing the primary storage resource(s) 121 associated with the designated virtual disk 171A-N (e.g., storage volume 924A-N).

The interim storage module 922 may be configured to service ephemeral I/O requests 916 identified within the I/O stack 107 by the monitor 134 based on one or more of: a) the virtual storage resource 171A-N associated with the ephemeral I/O request 916 (e.g., identifying ephemeral I/O requests 916 issued to the designated virtual storage resource 171A-N, disclosed above), b) metadata associated with the I/O request 916 (e.g., metadata associated with the ephemeral I/O request 916 by the write-vector module 932A-N, as disclosed above), c) by receiving the ephemeral I/O request 916 directly through the VM interface 148 from a write-vector module 932A-N, and/the like. The interim storage module 922 may service ephemeral I/O requests 916 by use of the scratch storage 941 (and/or resources provisioned to the corresponding VM 114A-N within the scratch storage 941). Ephemeral I/O requests 916 may be serviced by: a) writing data of the ephemeral I/O requests 916 to the scratch storage 941, b) reading data from the scratch storage 941, and/or the like. In some embodiments, the provisioner 144 allocates storage capacity within the host storage resource 541 for use as scratch storage 941. Alternatively, or in addition, the scratch storage 941 may be implemented using a separate host storage device and/or media. The provisioner 144 may be further configured to allocate capacity of the scratch storage 941 for use in servicing ephemeral I/O requests 916 of respective VMs 114A-N. The interim storage module 922 may manage respective data tag sets 935A-N corresponding to the resources provisioned to the VMs 114A-N, as disclosed herein. Servicing an ephemeral I/O request 916 may, therefore, comprise mapping and/or translating a PRID of the ephemeral I/O request 916 to a particular region and/or section of the host storage resource 541 (e.g., a region and/or section that has been allocated to the corresponding VM 114A-N) by use of a translation module 146. The translation module 146 may be further configured to map PRIDs of ephemeral I/O requests 916 to VCIDs within the scratch storage 941, as disclosed herein.

Further embodiments of systems and methods for identifying and servicing ephemeral I/O requests 916 are disclosed in U.S. patent application Ser. No. 14/245,893 entitled "Systems and Methods for Storage Virtualization," filed Apr. 4, 2014 for Jerene Zhe Yang et al., and U.S. patent application Ser. No. 13/829,358 entitled "Systems, Methods, and Interfaces for Adaptive Cache Persistence," filed Mar. 14, 2013 for Vikram Joshi et al., both of which are hereby incorporated by reference in their entirety.

The cache automation module 150 may be configured to automatically configure and/or re-configure caching services in response to changes to the I/O topology of the system 900, as disclosed herein. The cache automation module 150 may be further adapted to configure and/or re-configure write-vectoring services. In response to detecting deployment of a VM 114A-N and/or storage service 120 in the system 900 (by use of the monitor 552), the cache automation module 150 may determine a) whether to provide caching services for the VM 114A-N and/or storage service 120, as disclosed above, and b) whether to implement write-vectoring for the VM 114A-N and/or storage resource based on, inter alia, the autocache configuration 556. If caching services are to be implemented, the cache automation module 150 may automatically configure caching services by the identified VM 114A-N and/or storage service 120 by use of the configuration agent 554, as disclosed herein. The configuration agent 554 may also configure write-vectoring by a) configuring the write-vector module 932A-N of the VM 114A-N to identify and/or tag ephemeral I/O requests 916 within the I/O stack of the respective VM 114A-N as disclosed herein and/or b) configuring the cache service module 140 to present a designated virtual storage resource 171A-N within the VM 114A-N and configuring the VM 114A-N to associate ephemeral files (e.g., files 175A) with the designated virtual storage resource 171A-N (by use of the redirection module 926). Configuring write-vectoring may further comprise instructing the provisioner 144 to allocate cache storage resources to store ephemeral data of the VM 114A-N (in scratch storage 941) and/or configuring the monitor 134 to identify ephemeral I/O requests 916 within the I/O stack 107 (and to service the ephemeral I/O requests by use of the scratch storage 941 without accessing the underlying primary storage resources 121).

Figures 10A, 10B:
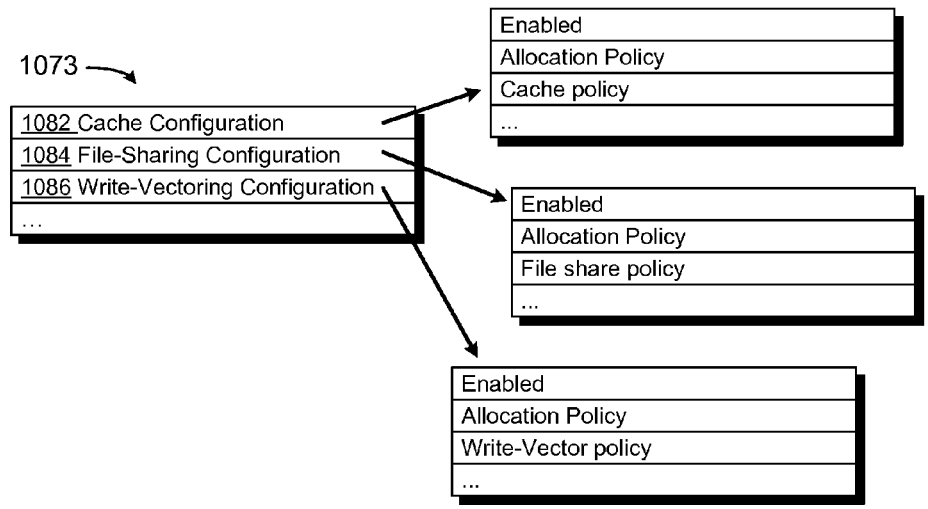
FIG. 10A depicts embodiments of cache automation metadata.
FIG. 10B depicts further embodiments of cache automation metadata.

As disclosed herein, the cache automation module 150 may comprise a policy 156 and/or autocache configuration 556 that may be used to deterministically identify storage resources (VMs 114A-N and/or storage services 120) to which caching services are to be provided, determine the configuration of the caching services, determine resource allocations, and so on. FIG. 10A depicts one embodiment of automation metadata 1056. The automation metadata 1056 disclosed herein may comprise policy and/or configuration metadata that enables the cache automation module 150 and/or cache automation service 1150 (disclosed below) to deterministically identify VMs 114A-N and/or storage services 120 to which caching services are to be provided. The automation metadata 1056 may be further configured to define a configuration and/or allocation policy pertaining to the caching services. In some embodiments, the automation metadata 1056 further comprises configuration metadata pertaining to file-sharing services and/or write-vectoring services, as disclosed herein.

Figure 11:
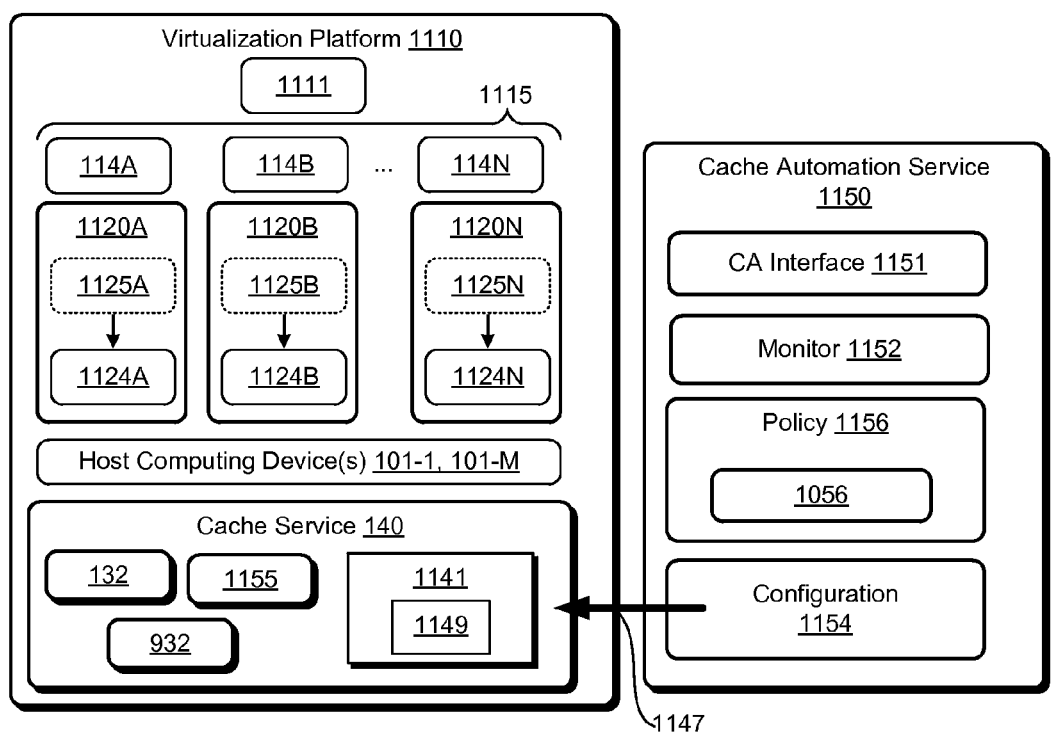
FIG. 11 is a block diagram depicting another embodiment of a system for automated I/O configuration.

Referring to FIGS. 10A-11, the cache automation service 1150 may comprise a cache automation interface 1151 that may be used to define and/or modify the cache automation metadata 1056 implemented by the policy module 1156. The cache automation interface 1151 may comprise and/or correspond to a graphical user interface through which an administrator may specify cache automation metadata, such as criteria 1070, configuration metadata 1072 (e.g., configuration metadata entries 1073), and so on. Accordingly, an administrator may access the cache automation interface 1151 to define a policy for automatically deploying caching services within the virtualization platform 1110, such that the cache automation service 1150 can automatically configure and/or re-configure caching services in response to changes in the I/O topology 1115 without user intervention.

The automation metadata 1056 illustrated in FIGS. 10A and 10B may comprise a plurality of entries comprising selection criteria 1070 with corresponding configuration metadata 1072. The criteria entries 1071A-N may correspond to characteristics of a VM 114A-N, storage service 120 (e.g., virtual storage resource 1245-N and/or primary storage resource 121), user, host (e.g., computing device 101), application, and/or the like. The configuration metadata entries 1073A-N may specify a) whether caching services are to be provided for the corresponding VM 114A-N and/or storage resource, b) a configuration for the caching services, c) resource allocation (e.g., relative priority, QoS, and/or the like), d) file-sharing and/or de-duplication configuration, e) write-vectoring configuration, and/or the like The criteria 1070 may correspond to any suitable property and/or characteristic within a virtual computing environment, including but not limited to properties and/or characteristics of: a host computing device 101, virtualization infrastructure 110, virtualization platform 510, virtualization environment 112, VMs 114A-N, storage resource, virtual storage resource 125A-N, users, applications, storage objects, and/or the like. In the FIG. 10A embodiment, the entry 1071A pertains to a property of a VM (e.g., the VM name or other identifier). The entry 1071A may correspond to VMs 114A-N having a name that includes and/or contains "SQL," which may indicate that the VM 114A-N is configured to provide database services. The configuration metadata entry 1073A may indicate that caching services are to be provided to the VM 114A-N and/or the storage services 120 thereof. The entry 1071B may correspond to a user associated with an application operating on the VM 114A-N and/or application associated with the storage resource (e.g., the particular storage service 120). The corresponding configuration metadata entry 1073B may indicate, inter alia, whether caching services are to be provided to particular storage resources (e.g., VMs 114A-N and/or storage services 120) associated with the specified application. The entry 1071C and corresponding configuration metadata 1073C may indicate, inter alia, whether caching services are to be provided to storage resources. The entries 1071D and 1071E (and corresponding configuration metadata entries 1073D and 1073E) define the cache configuration based on characteristics of a storage resource, such as the storage resource name (1071D) and/or storage resource type (1071E) (e.g., files associated with a storage service 120). The entry 1071F may be based on characteristics and/or properties (e.g., name) of a host computing device 101, and the corresponding configuration metadata entry 1073F may specify a configuration for autocaching services of VMs 114A-N and/or storage resources deployed on the host computing device 101. The entry 1071N may comprise a wildcard entry that defines a configuration for all VMs 114A-N and/or storage resources in the virtualization environment (e.g., that do not correspond to any of the other criteria 1070). The entry 1071N and corresponding configuration metadata entry 1073N may, for example, indicate that caching services are to be provided to all VMs 114A-N and/or storage resources deployed on the virtualization platform 510.

FIG. 10B depicts one embodiment of a configuration metadata entry 1073. In the FIG. 10B embodiment, the configuration metadata entry 1073 comprises cache configuration metadata 1082, file-sharing (de-duplication) configuration metadata 1084, and write-vectoring configuration metadata 1086. The cache configuration metadata 1082 may indicate whether caching services are to be provided and/or enabled for the corresponding storage resource (e.g., VM 114A-N and/or storage service 120). The cache configuration metadata 1082 may further provide an allocation policy which may be used to instruct the provisioner 144 to allocate resources for use in provided caching services to the corresponding storage resource. The allocation policy may determine a priority of the storage resource relative to other storage resource (e.g., other VMs 114A-N and/or storage services 120 to which the cache service module 140 is providing caching services). The allocation policy may, therefore, determine whether to re-provision resources from other storage resources in the cache 141. The application policy may further comprise Quality of Service requirements for the storage resource (e.g., the VM 114A-N and/or storage service 120), which may determine resource allocation(s) implemented by the provisioner 144. The cache configuration metadata 1082 may further include a cache policy, which may determine a cache configuration and/or policy implemented for the corresponding VM 114A-N and/or storage resource, such as a cache admission policy, eviction policy, cache mode, such as write-back, write-through, write-never (e.g., write-vectored or ephemeral), and/or the like, and so on.

The file-sharing configuration metadata 1084 may configure file-share cache service (de-duplication) for the storage resource (e.g., for the particular VM 114A-N and/or storage service 120). The file-sharing configuration metadata 1084 may indicate whether file-share caching services are enabled, provide allocation information, and so on, as disclosed herein. The file-sharing configuration metadata 1084 may further comprise a file-sharing policy (e.g., file selection criteria), which may be used to identify files for admission into the file-sharing cache, as disclosed herein.

The write-vectoring configuration metadata 1086 may define a write-vectoring configuration for the storage resource (e.g., particular VM 114A-N and/or storage service 120). The write-vectoring configuration metadata 1086 may indicate whether write-vectoring services are enabled, provide allocation information, and so on, as disclosed herein. The write-vectoring configuration metadata 1086 may further comprise a write-vector policy, which may be used to identify ephemeral I/O requests 916 (e.g., identify ephemeral files 175A, as disclosed herein).

FIG. 11 is a block diagram of another embodiment of a system 1100 for automated I/O configuration. The system 1100 comprises a cache automation service 1150, which may be deployed on a computing device, such one or more of the computing device 101-1, 101-M of FIG. 11. The cache automation service 1150 may comprise a monitor 1152 configured to identify changes to an I/O topology 1115 of a virtualization platform 1110. As disclosed above, the I/O topology 1115 may correspond to the storage resources within the system 1100, including the deployed VMs 114A-N and/or storage services 1120A-N utilized and/or referenced within the virtualization platform 1110 by respective VMs 114A-N. The VMs 114A-N may be deployed within a virtualization environment (e.g., hypervisor, virtualization kernel, and/or the like) on respective host computing device(s) 101-1, 101-M, as disclosed herein.

A storage service 1120A-N may correspond to a virtual storage resource 1125A-N managed by the virtualization platform 1110 (for use by one or more VMs 114A-N, as disclosed herein). A storage service 1120A-N may, therefore, correspond to a relationship between a virtual storage resource 1125A-N and a primary storage resource 1124A-N

(e.g., a file, disk volume, storage system and/or the like). Changes to the I/O topology 1115 may occur in response to deploying a VM 114A-N; migrating a VM 114A-N to/from a host computing device 101-1, 101-M; shutting down a VM 114A-N; creating initializing, utilizing, and/or referencing a storage service 1120A-N of a VM 114A-N; and/or the like.

The monitor 1152 may be configured to detect changes in the I/O topology 1115 by use of an interface 1111 of the virtualization platform 1110, by monitoring I/O operations implemented within the virtualization platform 1110, and/or the like, as disclosed herein. In response to detecting the addition of a storage resource (e.g., deployment of a VM 114A-N and/or storage service 1120A-N), a policy module 1156 of the cache automation service 1150 may a) determine whether caching services (and/or other I/O services) are to be enabled for the identified storage resource, and b) automatically configure caching services. The policy module 1156 may comprise automation metadata 1056, as disclosed herein. The policy module 1156 may use the automation metadata 1056 to deterministically identify storage resources to which caching services are to be provided and/or determine the configuration of such caching services (if any). The policy module 1156 may be further configured to deterministically identify file storage resources to which file sharing and/or write-vectoring services are to be provided and/or determine the configuration for such services (if any), as disclosed herein.

A configuration engine 1154 may be adapted to configure caching services in accordance with the automation metadata 1056. The configuration engine 1154 may configure caching services by, inter alia, a) configuring the cache service 140 to provision resources for use in caching data of the identified storage resource, and b) configuring the cache service 140 to identify I/O requests pertaining to the identified storage resource. In some embodiments, the configuration engine 1154 provides configuration information and/or directives to the cache service 140 by use of an interface 1147 of the cache service 140. Alternatively, or in addition, the configuration engine 1154 may provide configuration information and/or directives to a cache manager 132, file sharing cache 1155 (e.g., FSM 550 and/or VM FSM 522), and/or interim storage module 922 through the interface 1147 (and/or other communication mechanisms). The configuration engine 1154 may be configured to provide configuration information and/or directives to components operating within a base operating environment 106 of a host computing device 101, and/or to components operating within respective VMs 114A-N (e.g., through a VM interface 148 as disclosed herein).

As disclosed above in conjunction with FIGS. 1A-1D and 9, the cache service 140 may be configured to provide caching services for storage resources by use of a cache manager 132 operating within the base operating environment 106. In such embodiments, the configuration engine 1154 may configure caching services by a) instructing the cache service module 140 to provision resources for use in caching data of the storage resource (e.g., by use of the provisioner 144), b) providing configuration information to the cache manager 132 to enable the cache manager 132 to identify I/O requests 116 pertaining to the identified storage resource in an I/O stack 107 of the base operating environment 106 and/or virtualization platform 1100, and/or c) configuring a cache policy of the cache manager 132 (e.g., policy 402) in accordance with cache configuration metadata 1082 defined in the automation metadata 1056.

In some embodiments, and as disclosed in conjunction with FIGS. 1D and 9, the cache manager 132 may be configured to operate within a respective VM 114A-N. Referring to FIG. 1D, the cache manager 132A may be deployed within VM 114A. In such embodiments, the configuration engine 1154 may be adapted to provide configuration information and/or directives to the cache manager 132A through the interface 141 and/or the communication link 128 between the cache service module 140 and the cache manager 132A operating within the VM 114A. The configuration engine 1154 may configure the cache manager 132A to identify I/O requests 116A pertaining to the identified storage resource in an I/O stack 107A of the VM 114A (by use of a monitor 134A), and to forward the identified I/O requests 116A to the cache service module 140 through, inter alia, a virtual storage service 127. The configuration engine 1154 may also provide information pertaining to the cache policy 402A implemented by the cache manager 132A, as disclosed herein.

As illustrated above, the configuration engine 1154 may adapt the cache configurations implemented thereby based on whether caching services for the identified storage resource are provided by a cache manager 132 operating within the base operating environment 106 (base-level caching) or a cache manager 132A operating within the VM 114A-N associated with the identified storage resource (VM-level caching of a particular storage service 112A-N). Accordingly, the configuration engine 1154 may be configured to determine whether the VM 114A-N corresponding to the identified storage resource is configured for VM-level caching (e.g., comprises a cache manager 132 deployed therein, such as the cache manager 132A deployed within VM 114A, as illustrated in FIG. 1D), or will use base-level caching. The cache automation service 1150 may determine whether the identified storage resource is configured for VM-level caching by: a) querying the cache service module 140 (through the interface 1147), querying a cache manager 132 deployed within the corresponding VM 114A-N (through the interface 1147 and/or communication link 128), and/or the like. Alternatively, or in addition, the automation metadata 1056 may indicate whether the identified storage resource is associated with a VM 114A-N that is configured to implement VM-level caching. Accordingly, the configuration engine 1154 may automatically configure one or more of VM-level and/or base-level caching services in response to detecting the change in the I/O topology 1115 of the virtualization platform 1110.

As disclosed above, the configuration engine 1154 may be configured to instruct the cache service module 140 to allocate storage resources 1149 for use in providing caching services for the identified storage resource (by use of the provisioner 144, as disclosed herein). The configuration engine 1154 may instruct the cache service module 140 to allocate resources in accordance with an allocation policy defined, inter alia, in cache configuration metadata 1082 associated with the identified storage resource in the automation metadata 1056. The allocation policy may determine a relative priority for caching services pertaining to the identified storage resource, which may be used to provision and/or re-allocate resources of the host storage 1141 (e.g., cache 141, file-share store 543, scratch storage 941, and/or the like). The configuration engine 1154 may instruct the cache service module 140 and/or provisioner 144 to allocate and/or re-provision resources of the host storage 1141 in accordance with the relative priority of the VM 114A-N and/or identified storage resource, which may comprise reallocating resources in use by other VMs 114A-N and/or storage resources.

In some embodiments, the cache service module 140 may comprise a file-share module (FSM) 522 configured to implement file-share (de-duplication) caching services for the VMs 114A-N. The automation metadata 1056 associated with the identified storage resource may comprise file-sharing configuration metadata 1084 that indicates whether file-sharing services are to be enabled, specifies an allocation policy for file-sharing services, and/or defines a file-share policy. The configuration engine 1154 may be configured to implement the file-sharing configuration metadata 1084 by: a) instructing an FSM 550 of the cache service module 140 to allocate resources in the host storage 1141 for file-sharing services (if not already allocated), and b) configure the FSM 550 to provide file-sharing services for the identified storage resource (and/or corresponding VM 114A-N). The configuration engine 1154 may be further adapted to configure a VM FSM 550 operating within the corresponding VM 114A-N (e.g., VM 114N as illustrated in FIG. 5). In reference to the FIG. 5 embodiment, the configuration engine 1154 may issue configuration information and/or directives to the VM FSM 550 (through the communication link 128 and/or interface module 147) that configure the VM FSM 550 to: a) identify I/O requests 516 pertaining to files that are suitable for admission into the file-share store 543, b) instruct the VM FSM 550 to populate the dictionary 564 from primary storage (e.g., from a snapshot 567A-N), and/or c) configure the VM FSM 550 to service I/O requests 516 that pertain to file-sharing data by use of the FSM 522 (e.g., redirect the I/O requests 516 to the FSM 522 through, inter alia, the virtual storage service 127). The file-share configuration metadata 1084 may further include a file-share policy that defines, inter alia, file-selection criteria to enable the VM FSM 550 to identify files (and corresponding I/O requests 516) suitable for admission into the file-share store 543. Configuring file-sharing services may further include providing the VM FSM 550 with information pertaining to a file-share admission policy 565 defined within the file-share configuration metadata 1084. The configuration engine 1154 may, therefore, automatically configure a VM FMS 550 and/or FSM 522 to implement file-sharing services for the identified storage resource (e.g., VM 114A-N and/or storage service 1120A-N) in response to detecting the change to the I/O topology 1115.

In some embodiments, the cache service module 140 may comprise an interim storage module 922 configured to provide write-vectoring services. Referring to the FIG. 9 embodiment, the interim storage module 922 may be configured to identify ephemeral I/O requests 916, and to service the identified I/O requests 916 by use of scratch storage 941 (e.g., a partition and/or section of the host storage 1141). The automation metadata 1056 may comprise write-vectoring configuration metadata 1086 that determines, inter alia, whether write-vectoring services are to be provided for the particular storage resource (e.g., VM 114A-N and/or storage service 1120A-N). The configuration engine 1154 may automatically configure write-vectoring services by a) instructing the cache service module 140 to allocate resources in the host storage 1141 for write-vectoring services (if needed), and b) configure the interim storage module 922 to identify I/O requests 916 that pertain to ephemeral data. In some embodiments, the configuration engine 1154: a) instructs the cache service module 140 to present one or more designated, write-vectored virtual disks 171A-N within the corresponding VM 114A-N, and b) configures the VM 114A-N to associate ephemeral files (e.g., files 175A) with respective designated virtual disks 171A-N. The interim storage module 922 may identify I/O requests 916 issued to the designated virtual disks 171A-N as ephemeral, and service the I/O requests 916 by use of scratch storage 941, as disclosed herein. In other embodiments, the configuration engine 1154: a) configures a write-vector module 932A-N operating within one or more of the VMs 114A-N to identify ephemeral I/O requests 916 (by use of a respective monitor 934A-N), and b) forwards the identified I/O requests 916 to the interim storage module 922 and/or tags the I/O requests 916 as ephemeral. The configuration engine 1154 may, for example, provide the write-vector module 932A-N with a write-vector, file-selection policy, and/or criteria used to identify I/O requests 916 that pertain to ephemeral files (as defined in the write-vector policy of the write-vectoring configuration metadata 1086). Accordingly, the configuration engine 1154 may automatically configure the interim storage module 922 and/or VMs 114A-N to implement write-vectoring services as specified in the automation metadata 1056.

The monitor 1152 may be further configured to detect changes to the I/O topology 1115 indicating that a particular storage resource is no longer in use (e.g., removal of a VM 114A-N and/or storage service 1120A-N). Storage resource removal may correspond to one or more of: shutdown of a VM 114A-N (resulting in the removal of the storage service(s) 1120A-N utilized and/or referenced by the VM 114A-N), suspension of a VM 114A-N, migration of a VM 114A-N to another host computing device 101-1/101-M, deletion of a VM 114A-N, and/or the like. Alternatively, or in addition, removal of a storage resource may occur in response to a VM 114A-N deallocating a storage service 1120A-N by, inter alia, removing an association between a virtual storage resource 1125A-N and a primary storage resource 1124A-N. In response to detecting removal of a storage resource, the configuration engine 1154 may automatically deallocate the corresponding cache resources being used to provide caching and/or other I/O services (if any). The configuration engine 1154 may, for example, issue configuration information and/or directives to the cache serviced module 140 (through the interface 1147) to instruct the cache service 140 to: a) deallocate cache storage resources provisioned to the VM 114A-N or storage service 1120A-N in the cache 1141 (deallocate resources 1149), b) deallocate resources used to provide file-sharing services, and/or c) deallocate resources used to provide write-vectoring services. The cache service module 140 may reallocate the corresponding resources to other storage resources (e.g., to other VMs 114A-N and/or storage services 1120A-N).

In some embodiments, the virtualization platform 1110 may provide for transferring VMs 114A-N between host computing devices 101-1, 101-M. The monitor 1152 may detect transfer events and, in response, may configure the cache service module 140 to retain cache state metadata pertaining to the VM and/or transfer cache state metadata to another host computing device 101-1, 101-M. Further embodiments of systems and methods for managing and/or transferring cache state metadata are disclosed in U.S. patent application Ser. No. 13/541,659, entitled "Systems, Methods, and Apparatus for a Virtual Machine Cache," filed Jul. 3, 2012 for Vikram Joshi et al., and U.S. patent application Ser. No. 13/687,979, entitled "Systems, Methods, and Apparatus for Cache Transfers," filed Nov. 28, 2012 for Vikram Joshi et al., both of which are hereby incorporated by reference in their entirety.

Figure 12:
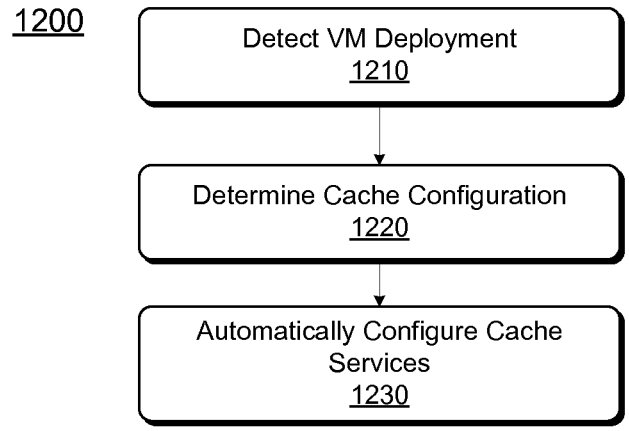
FIG. 12 is a flow diagram of one embodiment of a method for automated I/O configuration.

FIG. 12 is a flow diagram of one embodiment of a method 1200 for automated I/O configuration. One or more of the processing steps comprising the method 1200 and/or other methods disclosed herein may be embodied on a non-transitory, computer-readable storage medium as one or more software modules and/or as executable instructions. The modules and/or instructions may be configured for execution by a processor, such as the processing resources 102 of the computing device 101 disclosed herein. In some embodiments, the instructions (and/or portions thereof) are configured for execution by an ASIC and/or custom logic. Accordingly the instructions may comprise device-specific firmware and/or may be embedded on a hardware device or component. The instructions may be executable to cause the processor (and/or corresponding components of a computing device) to implement portions of the processing steps disclosed herein. Alternatively, the processing steps comprising the method 1200 and/or other methods disclosed herein, may be implemented by use of dedicated hardware components, such as an ASIC, PLC, and/or the like.

Step 1210 may comprise detecting deployment of a VM 114A-N in a virtual computing environment 112, as disclosed herein. Step 1210 may comprise receiving a notification of the VM deployment of an interface 111 and/or in response to monitoring I/O requests and/or other operations within the virtual computing environment 112.

Step 1220 may comprise determining a configuration for caching services pertaining to the deployed VM 114A-N. Step 1220 may comprise evaluating automation metadata 1056 to determine whether caching services are to be provided for the detected VM 114A-N, determine an allocation policy for the VM 114A-N, and/or determine a cache policy for storage services 120 utilized by the VM 114A-N. Step 1020 may comprise automatically determining the cache configuration without intervention of an administrator As disclosed herein, determining a cache configuration may refer to one or more of determining whether to provide caching services for the deployed VM 114A-N (and/or corresponding storage services 120), determining a configuration of the caching services to provide (if any), such as a cache mode, cache resource allocation(s), determining a file-sharing cache configuration, determining a persistence level (e.g., write-never, write-vectored, or ephemeral storage mode), and/or the like. Determining a cache configuration may comprise accessing and/or referencing cache automation metadata 1056, as disclosed herein, which may comprise evaluating criteria 1070 (e.g., entries 1071A-N), accessing cache configuration metadata 1082, file-sharing configuration metadata 1084, and/or write-vectoring configuration metadata 1086, and so on. Alternatively, or in addition, determining the cache configuration at step 1220 may comprise accessing and/or reading a configuration file, registry settings, database tables, directory entries, stored procedures, policies, directives, requesting cache configuration information (by use of the network 108), editing and/or modifying configuration information, retrieving configuration information, and/or the like.

Step 1230 may comprise configuring caching services for the detected VM in accordance with the determined cache configuration, as disclosed herein. Step 1230 may comprise configuring a cache service module 140 to a) provision resources to the VM 114A-N, and b) identify I/O requests 116 pertaining to the VM 114A-N (and/or storage services(s) 120 utilized by the VM 114A-N) within an I/O stack 107 of a base operating environment 106 and/or within an I/O stack of the detected VM 114A-N (e.g., I/O stack 107A of VM 114A, as illustrated in FIG. 1D). Step 1230 may further comprise configuring a cache manager 132 to service the identified I/O requests 116 by use of cache storage provisioned to the VM 114A-N. Step 1230 may further comprise configuring file-sharing services and/or write-vectoring services in accordance with the determined cache configuration (e.g., in accordance with automation metadata 1056 associated with the VM 114A-N). Step 1230 may, therefore, comprise automatically configuring caching services in response to detecting deployment of the VM 114A-N, without intervention by an administrator.

Figure 13:
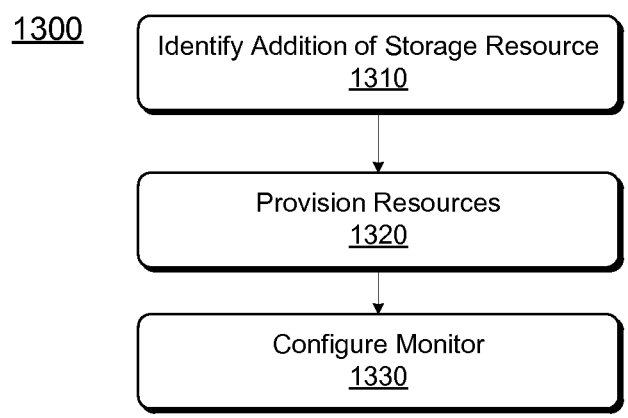
FIG. 13 is a flow diagram of another embodiment of a method for automated I/O configuration.

FIG. 13 is a flow diagram of another embodiment of a method 1300 for automated I/O configuration. Step 1310 may comprise identifying the addition of a storage resource in a virtualized computing environment 110, as disclosed herein. Step 1310 may correspond to deployment of a VM 114A-N (e.g., creation, transfer, resumption, boot, power-on, and/or startup of a VM 114A-N). Alternatively, or in addition, step 1310 may correspond to deployment of a storage service 120 within a VM 114A-N. Step 1310 may be implemented by use of a detector 152 and/or monitor 552, 1152, as disclosed herein.

Step 1320 may comprise provisioning cache storage resources for use in caching data of the identified storage resource in a cache 141 and/or host storage 541. Step 1320 may be implemented by use of a configuration engine 154, 1154 and/or configuration agent 554 as disclosed herein. In some embodiments, step 1320 further comprises determining whether to provide caching services for the identified storage resource based on characteristics and/or properties of the storage resources (e.g., whether the storage resource corresponds to a clustered shared storage service 120 referenced by and/or accessible to a plurality of VMs 114A-N and/or VMs on other host computing devices), characteristics and/or properties of the VM 114A-N associated with the storage resource (e.g., name of the VM 114A-N, VM identifier, VM type, and/or the like), characteristics and/or properties of applications associated with the storage resource, characteristics and/or properties of objects associated with the storage resource (e.g., files, database tables, and/or the like), and so on. In some embodiments 1320 comprises evaluating automation metadata 1056, as disclosed herein.

Step 1330 may comprise configuring a monitor 134 to identify I/O requests 116 that pertain to the identified storage resource. Step 1330 may comprise configuring a monitor 134 that identifies I/O requests 116 in an I/O stack 107 of a base operating environment 106 (outside an I/O stack of the respective VMs 114) and/or configuring a monitor 134 that identifies I/O requests 116 within the I/O stack of the VM 114A-N corresponding to the identified storage resource (e.g., monitor 134A of FIG. 1D). Step 1330 may further comprise configuring a cache manager 132 to service the identified I/O requests 116 using the cache 141. As disclosed herein, the cache manager 132 may be deployed within the base operating system 106 (for base-level caching implementations) and/or may be deployed within the VM 114A-N (for VM-level caching implementations). Accordingly, step 1330 may comprise automatically configuring caching services for the identified storage resource without intervention by an administrator. Step 1330 may further comprise automatically configuring other I/O services, such as file-sharing services and/or write-vectoring services for the identified storage resource, as disclosed herein.

Figure 14:
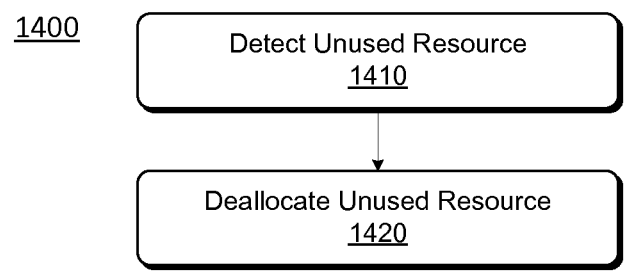
FIG. 14 is a flow diagram of another embodiment of a method for automated I/O configuration.

FIG. 14 is a flow diagram of another embodiment of a method 1400 for automated I/O configuration. Step 1410 may comprise detecting removal of a VM 114A-N and/or storage resource, as disclosed herein. Step 1420 may comprise automatically deallocating resources used to provide caching services (and/or other I/O services) for the removed VM 114A-N and/or storage service 120 (by use of a configuration engine 154/1154 or configuration agent 554). Step

1420 may further comprise re-provisioning the resources for use by other VMs 114A-N and/or storage resources, as disclosed herein.

Reference throughout this specification to features, advantages, or similar language does not imply that all of the features and advantages that may be realized are included in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but does not necessarily, refer to the same embodiment.

Furthermore, the features, advantages, and characteristics described herein may be combined in any suitable manner in one or more embodiments. One skilled in the relevant art will recognize that the disclosed embodiments may be practiced without one or more of the specific features or advantages of a particular embodiment. In other instances, additional features and advantages may be recognized in certain embodiments that may not be present in all embodiments. These features and advantages of the disclosed embodiments will become more fully apparent from the preceding description and appended claims, or may be learned by the practice of the embodiments as set forth herein.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic devices, programmable logic devices, or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer-readable media.

Reference throughout this specification to "one embodiment," "an embodiment," or similar language means that a particular feature, structure, or characteristic described in connection with the embodiment is included in at least one embodiment. Thus, appearances of the phrases "in one embodiment" and "in an embodiment" and similar language throughout this specification may, but do not necessarily, all refer to the same embodiment.

A computer-readable medium as referenced herein may take any form capable of storing machine-readable instructions on a digital processing apparatus. A computer-readable medium may be embodied by a compact disk, a digital-video disk, a magnetic tape, a Bernoulli drive, a magnetic disk, a punch card, flash memory, integrated circuits, or other digital processing apparatus memory devices.

Furthermore, the features, structures, or characteristics disclosed herein may be combined in any suitable manner in one or more embodiments. In the preceding description, numerous specific details are provided, such as examples of programming, software modules, user selections, network transactions, database queries, database structures, hardware modules, hardware circuits, and hardware chips, to provide a thorough understanding of the disclosed embodiments. One skilled in the relevant art will recognize, however, that the teachings of the disclosure may be practiced without one or more of the specific details, or with other methods, components, materials, and so forth. In other instances, well-known structures, materials, or operations are not shown or described in detail to avoid obscuring aspects of the disclosed embodiments.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

We claim:

1. A method, comprising:
  detecting a virtual machine deployed on a host computing device, wherein the detected virtual machine is associated with two or more storage resources;
  determining a cache configuration for the detected virtual machine; and
  configuring a cache to service input/output (I/O) requests pertaining to the detected virtual machine in accordance with the determined cache configuration, wherein configuring the cache comprises:
    determining whether to enable caching for each of the two or more storage resources associated with the detected virtual machine, the determining comprising determining to enable caching for a first one of the storage resources and to disable caching for a second one of the storage resources, and
    configuring an I/O monitor of the cache to: identify I/O requests pertaining to the detected virtual machine, redirect identified I/O requests associated with the first storage resource to the cache, and ignore identified I/O requests associated with the second storage resource.

2. The method of claim 1, wherein the cache comprises a file-share cache configured to cache a single copy of cached file data for two or more different virtual machines, wherein the determined cache configuration comprises a file-share criterion, and wherein configuring the cache further comprises causing the cache to use the file-share criterion to select identified I/O requests to service using the file-share cache.

3. The method of claim 1, wherein configuring the I/O monitor comprises activating an I/O filter configured to identify I/O requests pertaining to the detected virtual machine within the host computing device.

4. The method of claim 1, wherein the I/O monitor comprises a storage driver operating within the host computing device, and wherein configuring the cache further comprises configuring the storage driver to receive I/O requests of the virtual machine associated with the first storage resource and to redirect the received I/O requests to the cache.

5. The method of claim 1, further comprising determining to disable caching for the second storage resource in response to determining that the second storage resource comprises a cluster shared volume.

6. An apparatus, comprising:
a cache manager configured to service storage requests of one or more virtual machines operating in a virtual computing environment;
a detector configured to detect addition of an identified storage resource to the virtual computing environment;
a cache automation service configured to determine whether to enable caching for the identified storage resource or exclude the identified storage resource from caching; and
a configuration engine to configure the cache manager for the identified storage resource, the configuration engine configured to:
in response to the cache automation service determining to enable caching for the identified storage resource, configure the cache manager to service storage requests directed to the identified storage resource by the virtual machines, and
in response to the cache automation service determining to exclude the identified storage resource from caching, configure the cache manager to ignore storage requests directed to the identified storage resource by the virtual machines.

7. The apparatus of claim 6, wherein the configuration engine is further configured to:
configure a monitor of the cache manager to detect storage requests pertaining to the identified storage resource in a storage stack,
in response to the cache automation service determining to enable caching for the identified storage resource, configure the monitor to redirect the detected storage requests to the cache manager, and
in response to the cache automation service determining to exclude the identified storage resource from caching, configure the monitor to ignore the detected storage requests.

8. The apparatus of claim 6, wherein the cache automation service is further configured to determine whether to cache data of the identified storage resource based on one or more of a type of the identified storage resource, a name of a virtual machine associated with the identified storage resource, an application associated with the identified storage resource, and a file name associated with the identified storage resource.

9. The apparatus of claim 6, wherein the configuration engine determines to exclude the identified storage resource from caching in response to determining that the identified storage resource is a volume shared by one or more different virtual machines.

10. The apparatus of claim 6, wherein the cache manager is further configured to:
service storage requests according to one or more cache modes, including a write through cache mode, a write back cache mode, and an ephemeral cache mode, wherein the configuration engine configures the cache manager to select cache modes for write requests directed to the identified storage resource,
service a write request according to one of the write through cache mode and the write back cache mode by caching data of the write request in cache storage of the cache manager such that the data of the write request is to be written to the identified storage resource before being evicted by the cache manager, and
service the write request according to the ephemeral cache mode by caching the data of the write request in scratch storage of the cache manager such that the data of the write request is not written to the identified storage resource before being evicted by the cache manager.

11. The apparatus of claim 6, further comprising a driver configured to detect storage requests directed to the identified storage resource within a guest operating system of a virtual machine,
wherein the configuration engine is further configured to:
in response to the cache automation service determining to enable caching for the identified storage resource, configure the driver to redirect the detected storage requests to the cache manager, and
in response to the cache automation service determining to exclude the identified storage resource from caching, configure the driver to ignore the detected storage requests.

12. The apparatus of claim 6, wherein the cache manager comprises a file-sharing cache configured to cache file data shared by two or more virtual machines, wherein the configuration engine is further configured to cause the cache manager to implement a file-sharing policy for the identified storage resource, wherein the cache manager is further configured to use the file-sharing policy to select storage requests, of the storage requests directed to the identified storage resource by the virtual machines, to service using the file-sharing cache.

13. The apparatus of claim 6, wherein the configuration engine is further configured to configure the cache manager to distinguish storage requests that pertain to persistent data of the identified storage resource from write requests that pertain to ephemeral data of the identified storage resource, and
wherein the cache manager is further configured to:
cache the persistent data of the identified storage resource in a cache storage, wherein the persistent data is designated to be written to the identified storage resource in one of a write back mode and a write through mode, and
cache the ephemeral data of the identified storage resource in scratch storage, separate from the cache storage, wherein the ephemeral data is not designated to be written to the identified storage resource.

14. The apparatus of claim 6, wherein the detector is further configured to detect the addition of the identified storage resource in response to one or more of initialization of a virtual machine within the virtual computing environment and initialization of a storage resource within the virtual computing environment.

15. The apparatus of claim 6, wherein the detector is further configured to detect the addition of the identified storage resource by use of an application programming interface of the virtual computing environment.

16. A system, comprising:
a monitor that detects deployment of a virtual storage volume within a virtualization infrastructure; and
a configuration agent that automatically configures caching services for the deployed virtual storage volume by use of autocache metadata, the autocache metadata comprising a plurality of selection criteria, each selection criterion corresponding to a respective cache configuration, wherein, in response to the detection, the configuration agent is configured to select a cache configuration using the selection criterion and to apply the selected cache configuration, wherein applying the selected cache configuration comprises:
configuring an input/output (I/O) monitor to identify I/O requests issued by virtual machines operating within the virtualization infrastructure that pertain to the deployed virtual storage volume,
providing a file-share policy to a file-share cache, the file-share policy to configure the file-share cache to service first I/O requests of the identified I/O requests, and
providing a cache policy to a cache manager, the cache policy to configure the cache manager to service I/O requests of the identified I/O requests, other than the first I/O requests, using cache storage allocated to the virtual machines,
wherein the file-share cache is configured to service the first I/O requests by admitting file data of the virtual machines into the file-share cache and providing access to the admitted file data to two or more of the virtual machines.

17. The system of claim 16, wherein the monitor detects deployment of the virtual storage volume by use of an interface provided by the virtualization infrastructure.

18. The system of claim 16, wherein configuring the file-share cache to service the first I/O requests comprises configuring the file-share cache to use a file-selection criterion to identify the first I/O requests of the identified I/O requests, the file selection criterion comprising one or more of a file name criterion and a file path criterion.

19. The system of claim 16, wherein the configuration agent configures a storage driver operating within a guest operating system to redirect I/O requests pertaining to the detected virtual storage volume to the I/O monitor.

20. The system of claim 16, wherein applying the selected cache configuration further comprises:
configuring an ephemeral cache to service second I/O requests of the identified I/O requests, other than the first I/O requests,
wherein the cache manager is configured to service write requests other than write requests of the first I/O requests and the second I/O requests by storing data in the cache storage allocated to the virtual machines, the stored data being designated for storage on a backing store associated with the deployed virtual storage volume, and
wherein the ephemeral cache is configured to service write requests of the second I/O requests by storing data in a scratch storage, separate from the cache storage, wherein data stored in the scratch storage is designated to be erased without being written to the backing store.

21. The system of claim 20, wherein the selection criteria of the autocache metadata are based on one or more of: storage volume type, virtual machine name, storage volume file name, and application name.

* * * * *